(12) United States Patent
Ward et al.

(10) Patent No.: US 11,508,099 B2
(45) Date of Patent: Nov. 22, 2022

(54) SYSTEM AND METHOD FOR COLOR MAPPING FOR IMPROVED VIEWING BY A COLOR VISION DEFICIENT OBSERVER

(71) Applicant: FAURECIA IRYSTEC INC., Montreal (CA)

(72) Inventors: Greg Ward, Berkeley, CA (US); Tara Akhavan, Montreal (CA); Hyunjin Yoo, Montreal (CA); Mina Rafi Nazari, Montreal (CA)

(73) Assignee: FAURECIA IRYSTEC INC., Montreal (CA)

( * ) Notice: Subject to any disclaimer, the term of this patent is extended or adjusted under 35 U.S.C. 154(b) by 0 days.

(21) Appl. No.: 17/056,143

(22) PCT Filed: May 17, 2019

(86) PCT No.: PCT/CA2019/050671
§ 371 (c)(1),
(2) Date: Nov. 17, 2020

(87) PCT Pub. No.: WO2019/218078
PCT Pub. Date: Nov. 21, 2019

(65) Prior Publication Data
US 2021/0358182 A1 Nov. 18, 2021

Related U.S. Application Data

(60) Provisional application No. 62/673,336, filed on May 18, 2018.

(51) Int. Cl.
*G06T 11/00* (2006.01)
*G06T 7/90* (2017.01)
(Continued)

(52) U.S. Cl.
CPC ............ *G06T 11/001* (2013.01); *G06V 10/25* (2022.01); *G06V 10/50* (2022.01); *G06V 10/56* (2022.01); *G09B 21/008* (2013.01)

(58) Field of Classification Search
CPC combination set(s) only.
See application file for complete search history.

(56) References Cited

U.S. PATENT DOCUMENTS 6,985,524 B1 * 1/2006 Borchers .............. G09B 21/008
345/549
7,394,468 B2 * 7/2008 Hofman ............... H04N 1/6075
345/581
(Continued)

OTHER PUBLICATIONS

International Search Report and Written Opinion corresponding to PCT/CA2019/050671, dated Jul. 11, 2019.
(Continued)

*Primary Examiner* — Wesner Sajous
(74) *Attorney, Agent, or Firm* — Reising Ethington P.C.

(57) ABSTRACT

A method and system for color mapping digital visual content for improved viewing by a color vision deficient observer includes receiving the digital visual content to be color mapped, clustering color values of the digital visual content into a plurality of color clusters, assigning each color cluster to a respective one of a set of target color values in which the set of target color values have increased visual distinguishability for the color vision deficient observer; and for each color cluster, mapping the color values of the color cluster to the target color value, thereby generating a color-mapped digital visual content. One or more regions of interest of the content can be identified and the color mapping may be applied onto to those regions of interest.

9 Claims, 21 Drawing Sheets

(51) Int. Cl.
G06V 10/25 (2022.01)
G06V 10/50 (2022.01)
G06V 10/56 (2022.01)
G09B 21/00 (2006.01)
G09G 5/06 (2006.01)
G06K 9/46 (2006.01)

(56) References Cited

U.S. PATENT DOCUMENTS

2006/0256127 A1* 11/2006 Cho .................. A61B 3/066 345/591
2010/0321400 A1* 12/2010 Miyahara ............. G09G 5/028 345/600
2016/0365017 A1* 12/2016 Park ................... G06F 3/04847

OTHER PUBLICATIONS

European Search Report corresponding to European Application 19803910.9, dated Feb. 14, 2022; 8 pages.

Jia-Bin Huang et al.: "Image recolorization for the colorblind", Acoustics, Speech and Signal Processing, 2009. ICASSP 2009. IEEE International Conference on, IEEE, Piscataway, NJ, USA, Apr. 19, 2009 (Apr. 19, 2009), pp. 1161-1164.

Jia-Bin Huang et al: "Enhancing Color Representation for the Color Vision Impaired Enhancing Color Representation for the Color Vision Impaired. Workshop on Computer Vision Applications for the Visually Impaired, Enhancing Color Representation for the Color Vision Impaired", Sep. 16, 2008 (Sep. 16, 2008), Retrieved from the Internet: URL: https://hal.inria.fr/inria-00321936; [retrieved on Jan. 31, 2022]; * the whole document *.

M. Lefebvre et al.: "EUROGRAPHICS 2014/ S A; Survey of Color Mapping and its Applications", Jan. 1, 2014 (Jan. 1, 2014), Retrieved from the Internet: URL:http://taniapouli.co.uk/research/EG201 4star.pdf [retrieved on Jun. 9, 2015]; * the whole document *.

Pendhari Nazneen et al.: "Color modification system for barrier free vision", 2017 International Conference on Innovations in Information, Embedded and Communication Systems (ICIIECS), IEEE, Mar. 17, 2017 (Mar. 17, 2017), pp. 1-4, DOI: 10.1109/ICIIECS.2017.8275998; [retrieved on Jan. 30, 2018]* the whole document *.

* cited by examiner

Before Color Mapping

After Color Mapping

SYSTEM AND METHOD FOR COLOR MAPPING FOR IMPROVED VIEWING BY A COLOR VISION DEFICIENT OBSERVER

RELATED PATENT APPLICATION

This non-provisional utility patent application is a national stage entry of International Patent Application No. PCT/CA2019/050671, filed May 17, 2019. The present application claims priority from U.S. provisional patent application No. 62/673,336, filed May 18, 2018 and entitled "SYSTEM AND METHOD FOR COLOR MAPPING FOR IMPROVED VIEWING BY A COLOR VISION DEFICIENT OBSERVER". The disclosure of each of the aforementioned applications is hereby incorporated by reference in their entireties.

TECHNICAL FIELD

The present disclosure generally relates to systems and methods for remapping colors of digital visual content to improve viewing of the content by a color vision deficient person.

BACKGROUND

The three more common classes of color vision deficiency (commonly called "colorblindness") correspond to a deficiency in the number or function of a particular cone pigment in the retina. The protan class includes individuals with either no long wavelength cones (protanopia, pop. ~1% males) or deficient L cones (protanomaly, pop. ~1% males, 0.01% females). The deutan class includes individuals with either no medium wavelength cones (deuteranopia, pop. ~1% males) or deficient M cones (deuteranomaly, pop. ~6% males, 0.4% females). The tritan class is evenly distributed among men and women who have either no short wavelength cones (tritanopia, pop. ~1%) or deficient S cones (tritanomaly, pop. ~0.01%).

Together, the protan and deutan classes are often grouped into the broader category of red/green color vision deficiency, affecting about 9% of the male population altogether. These two classes make the majority of color vision deficient individuals and are similar as the colors confused are largely shared between the two types.

For each class of color vision deficiency, the spectral sensitivity profile of one of the photoreceptors can be modeled as a shifted version of the normal spectral sensitivity curves, as shown in FIG. 1.

Each class of color vision deficiency can be modeled by a set of confusion lines in a given color space. Color values falling on the same confusion line will have low visual distinguishability for a color vision deficient person. The confusion lines are typically drawn through the two-dimensional space forming the chromaticity. The sets of confusion lines for each class of color vision deficiency will be different. FIG. 2 illustrates a typical trichromat color space in CIE chromaticity (which is distinguishable by a person without color vision deficiency) and the corresponding confusion lines for the deutan class of color vision deficiency.

SUMMARY

According to one aspect, there is provided a method for color mapping digital visual content for improved viewing by a color vision deficient observer, the method includes receiving the digital visual content to be color mapped, clustering colors values of the digital visual content into a plurality of color clusters, assigning each color cluster to a respective one of a set of target color values, the set of target color values having increased visual distinguishability for the color vision deficient observer, and for each color cluster, mapping the color values of the color cluster to the target color value, thereby generating a color-mapped digital visual content.

According to another aspect, there is provided a computer-implemented system for mapping digital visual content for improved viewing by a color vision deficient observer, the system comprising at least one processor configured for receiving the digital visual content to be color mapped, clustering colors values of the digital visual content into a plurality of color clusters, assigning each color cluster to a respective one of a set of target color values, the set of target color values having increased visual distinguishability for the color vision deficient observer, and for each color cluster, mapping the color values of the color cluster to the target color value, thereby generating a color-mapped digital visual content.

According to yet another aspect, there is provided a computer readable storage medium comprising computer executable instructions, which when executed by at least one processor causes the at least one processor to perform receiving the digital visual content to be color mapped, clustering colors values of the digital visual content into a plurality of color clusters, assigning each color cluster to a respective one of a set of target color values, the set of target color values having increased visual distinguishability for the color vision deficient observer, and for each color cluster, mapping the color values of the color cluster to the target color value, thereby generating a color-mapped digital visual content.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1:
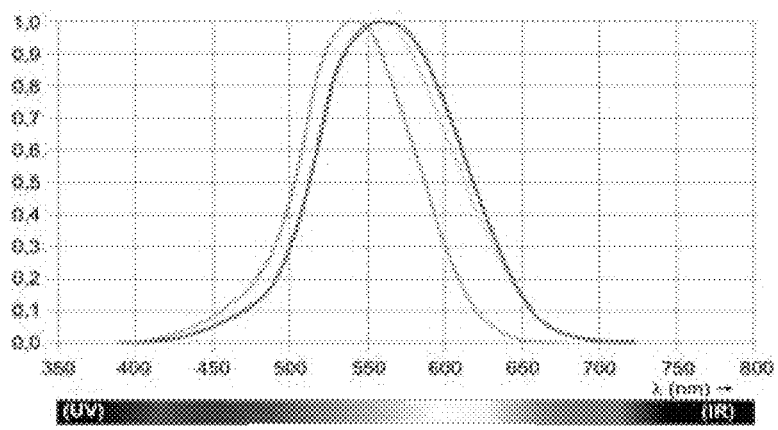
FIG. 1 illustrates a model of the spectral sensitivity profile of one of the photoreceptors.
Figure 2:
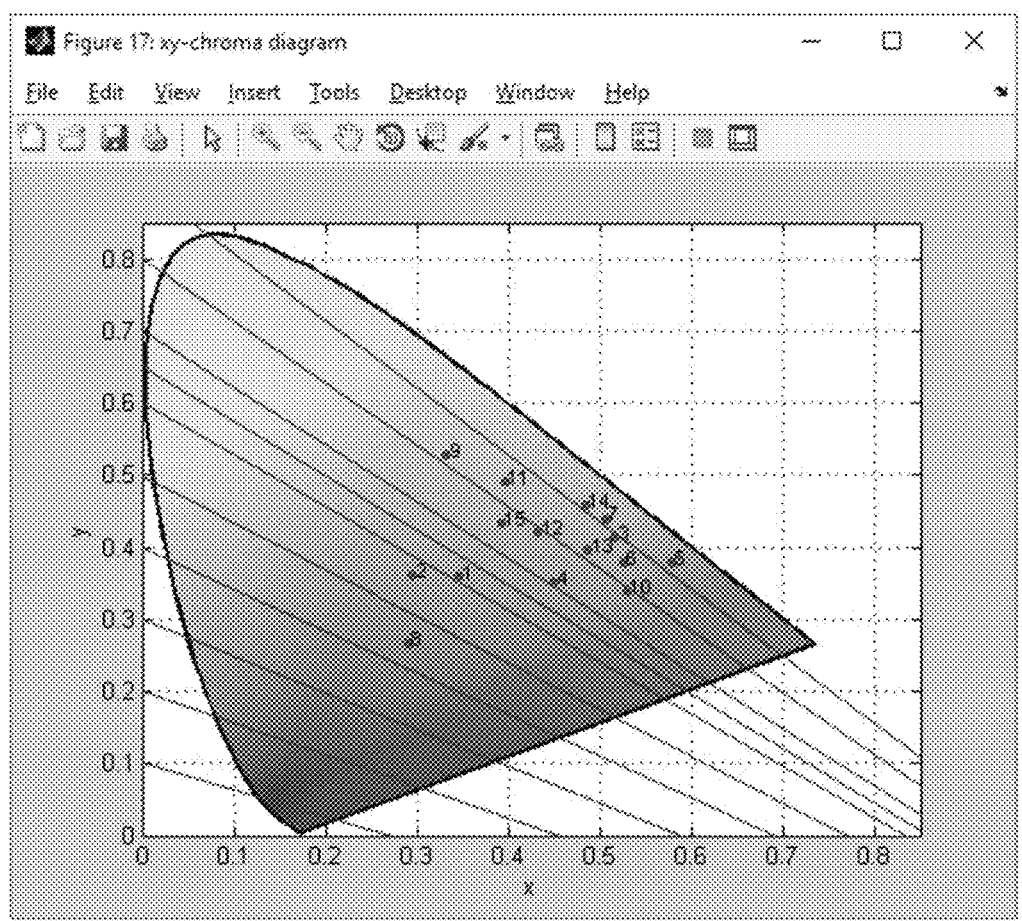
FIG. 2 illustrates a typical trichromat color space with the confusion lines for a deutan class of color vision deficiency.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

Broadly described, various example embodiments described herein provide for a system and method for remapping color values of a digital visual content item to improve viewing by a color vision deficient observer. The system and method improve viewing by clustering color values of the digital visual content into a plurality of color clusters, assigning the color clusters to target color values that have increased visual distinguishability for the color vision deficient observer; and mapping the color clusters to the target color values, thereby generating a color-mapped digital visual content. This digital visual content, when displayed on an electronic display device will have color characteristics that are more easily distinguishable for the color vison deficient observer. The remapping of color values may be applied to primarily, or only, to regions of interest within the digital visual content.

One or more color vision deficiency viewing improvement systems and methods described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, wearable device, tablet device, virtual reality devices, smart display devices (ex: Smart TVs), set-top box, video game console, or portable video game devices.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein. In some embodiments, the systems may be embedded within an operating system running on the programmable computer. In other example embodiments, the system may be implemented in hardware, such as within a video card.

Furthermore, the systems, processes and methods of the described embodiments are capable of being distributed in a computer program product comprising a computer readable medium that bears computer-usable instructions for one or more processors. The medium may be provided in various forms including one or more diskettes, compact disks, tapes, chips, wireline transmissions, satellite transmissions, internet transmission or downloadings, magnetic and electronic storage media, digital and analog signals, and the like. The computer-usable instructions may also be in various forms including compiled and non-compiled code.

The one or more color vision deficiency viewing improvement system and methods described herein are applied to digital visual content to be displayed on an electronic display device. Without limitation, the electronic display device may be a computer monitor, a screen of mobile device (ex: tablet, smartphone, laptop, wearable device), a screen of video game console, a TV, etc. The display device may be implemented using display technologies such as OLED, LCD, quantum dot display, laser projector, CRT, etc.

"Digital visual content" herein refers to all forms of content provided digitally and that is adapted to be displayed on an electronic display device. The digital visual content may be in the form of digital images, digital video, or text. The digital visual content may be presented in various forms, such as within a user interface, a video game, a PowerPoint presentation, web page etc.

The "region(s) of interest" of a digital visual content correspond to portions of a digital visual content items to which color mapping for improved viewing is to be applied. Various methods for determining the region(s) of interested are described herein. In some embodiments, portions of the digital visual content that are not determined as being a region of interest are not color mapped.

A "graphical element" herein refers to a type of digital visual content, or a portion (ex: a region of interest) of a digital visual content, that is structured to present information to present, or aid presentation of, information to an observer. The determination of regions of interest can result in identifying the graphical elements of a digital visual content. The graphical element will typically be generated or rendered artificially (either generated by a human user or generated by a computer) and is to be distinguished from a captured element. Whereas the graphical element will typically have shapes and colors that are combined together to present information visually, a captured element consists of images (ex: photographs) or video captured (ex: video captured using a video capture device) of objects or scenes existing in nature.

A graphical element can be one or more of a user interface, graphical chart, visual graph, map, graphical elements of a webpage or application, etc.

It was observed that graphical elements of digital visual content can be more suitable for color mapping because the colors of graphical elements are often intended to be visually distinguishable, for example, to highlight differences between the graphical elements. Moreover, the colors are often chosen only to highlight differences of information associated to the graphical elements. This is in contrast to captured elements, wherein the colors of a captured object in the digital visual content should represent the actual colors of that object.

It was further observed that there is a greater need for color mapping of graphical elements. Colors of graphical elements are often deliberately chosen to be visually distinguishable from one another, for example, to better present the information. Such colors are chosen for an observer that does not have color vision deficiency. However, a color vision deficient observer viewing these graphical elements can confuse sets of colors in the elements and will not experience the differentiation in the information that was intended from having different colors. Moreover, graphical elements can often have similar shapes and/or sizes that make distinguishing between elements more difficult without color. This can be contrasted from captured elements in which various objects captured in a scene (ex: environmental objects, objects in background, etc.) can provide reference points that allows an observer to distinguish portions of the captured element.

Figure 3A:
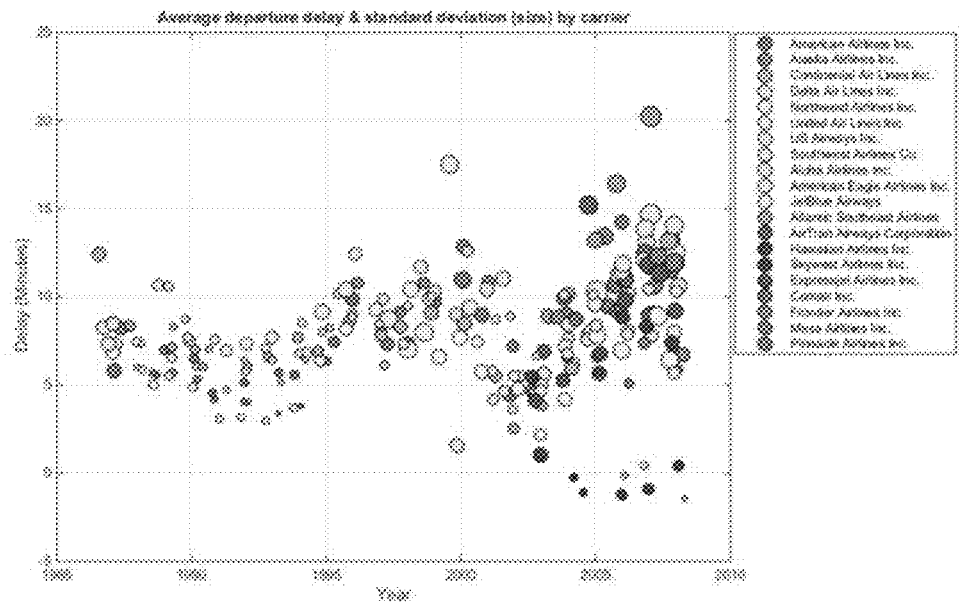
FIG. 3A is a graphical plot in which various results (ex: departure delay) for various datasets (ex: airlines) are shown using a set of different colors.

FIG. 3A is a graphical plot (a type of graphical element) in which various results (ex: departure delay) for various datasets (ex: airlines) are shown using a set of different colors. It will be appreciated the set of different colors are visible for a non-color vision deficient viewer.

Figure 3B:
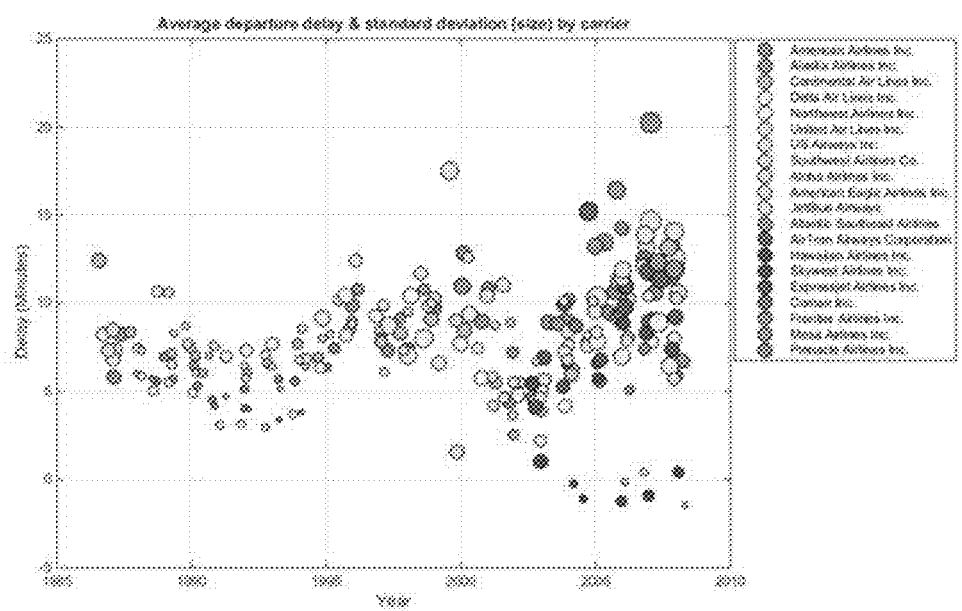
FIG. 3B is the graphical plot of FIG. 3A as it would be perceived (based on a simulation) by a deuteranopic observer.

FIG. 3B is the graphical plot of FIG. 3A as it would be perceived (based on a simulation) by a deuteranopic observer. It will be appreciated that some of the colors assigned to multiple airlines are now difficult to distinguish.

Figure 4:
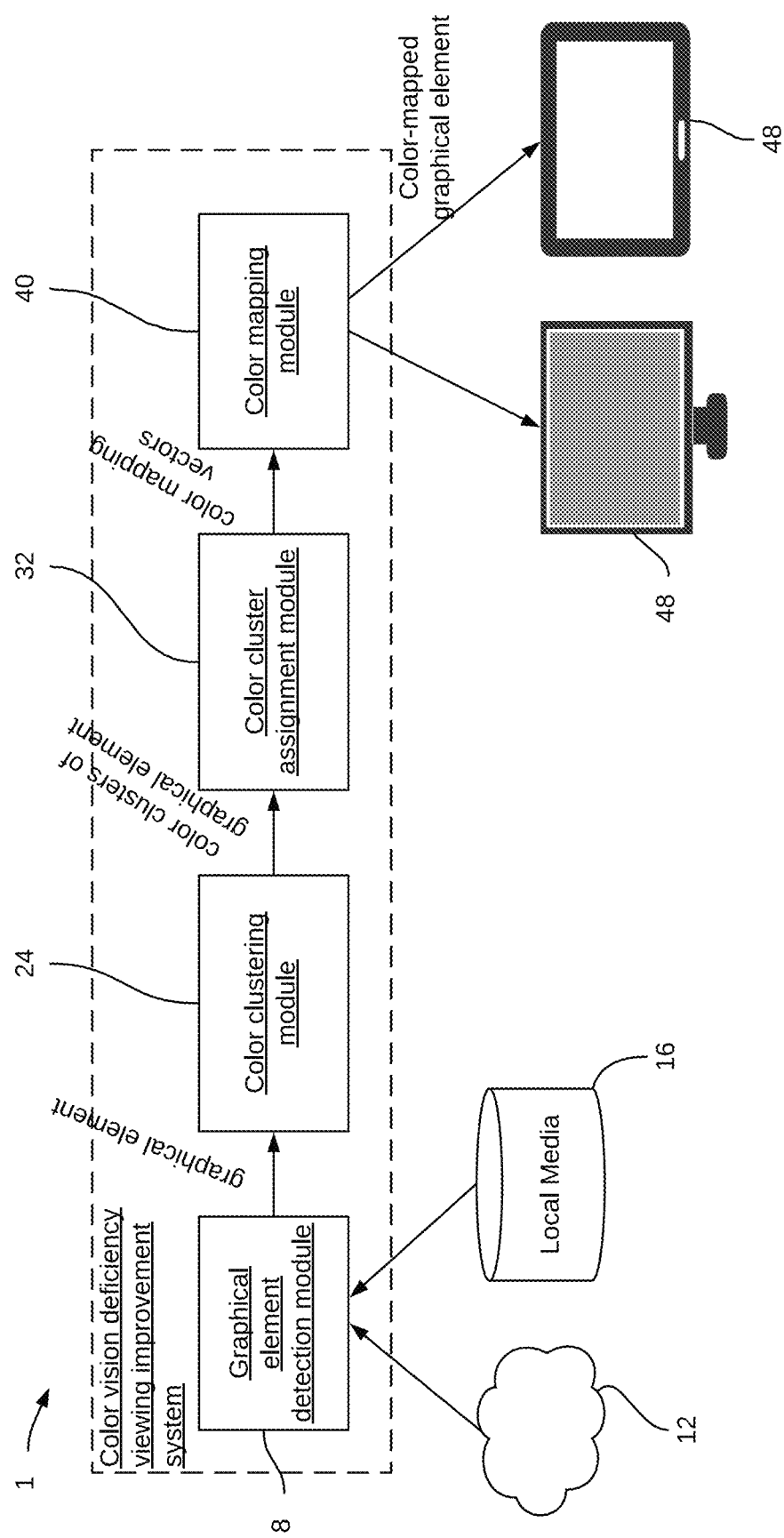
FIG. 4 illustrates a schematic diagram of a color vision deficiency viewing improvement system according to an example embodiment.

Referring now to FIG. 4, therein illustrated is a schematic diagram of a color vision deficiency viewing improvement system 1 according to an example embodiment.

The color vision deficiency viewing improvement system 1 can optionally include a region of interest (ROI) detection module 8 that is operable to receive digital visual content and detect the regions of interest of the digital visual content. The detected regions of interest are kept for further processing to adjust characteristics thereof for improved viewing by a color vision deficient observer. Other portions of the digital visual content that do not correspond to regions of interest are not treated. The detection of the regions of interest can be carried out in accordance with various methods described elsewhere herein. The detected regions of interest may correspond to graphical elements contained in the digital visual content. The detected regions of interest may also be regions having color values that occur frequently in the digital visual content (ex: a background, etc.).

The digital visual content to be displayed can be received from a remote device, such as over a communications network 12, such as from a server or cloud-based network. The digital visual content can also be stored locally on local media 16 or generated locally on the same device that implements the color vision deficiency viewing improvement system 1.

The color vision deficiency viewing improvement system 1 further includes a color clustering module 24 that is operable to receive the digital visual content, detected color values found within the content and to cluster the color values into a plurality of color clusters. The clustering of color values of the digital visual content can be carried out in accordance with various methods described elsewhere herein.

The color clustering module 24 can receive the digital visual content from the ROI detection module 8, in which case only the ROIs detected by the ROI detection module 8 are received. Alternatively, the color clustering module 24 can receive the digital visual content directly from a source (remote device 12 or local storage 16) without detecting the ROIs. This may be the case, where it is known that the digital visual content is already in a form for which the color mapping described herein will be effective.

The color vision deficiency viewing improvement system 1 further includes a color cluster assignment module 32 that is operable to assign the color clusters to a set of target color values. The color values of the target set have increased visual distinguishability for the color vision deficient observer. The assignment of color clusters to the set of target values can define color mapping vectors for mapping color values of digital visual content to color values of the target set. The assignment of color clusters to target color values can be carried out in accordance with various methods described elsewhere herein.

The color vision deficiency viewing improvement system 1 further includes a color mapping module 40 that is operable to map the color values of the digital visual content to the target set of values. For each color cluster determined by the color clustering module 24, the color mapping module 40 maps the color values of that color cluster to the target color value assigned to it by the color cluster assignment module 32. The mapping of the color values can be carried out in accordance with various methods describe elsewhere herein. A color-mapped digital visual content that is ready for display is outputted from the color mapping module 40. This digital visual content is displayed on the electronic display device 48.

The electronic display device 48 can be integrated to the device implementing the color vision deficiency viewing improvement system 1 (ex: screen of a smartphone, tablet or game console) or directly connected, via a display cable to the implementing device (ex: monitor connected to computer or game console).

Alternatively, the color vision deficiency viewing improvement system 1 may be implemented on a device located remotely of the electronic display device 40. The color-mapped digital visual content can be transmitted over a communication network to the electronic display device 40. It will be appreciated that in this case, the color vision deficiency viewing improvement system 1 is implemented as a server-based or cloud-based system.

Figure 5:
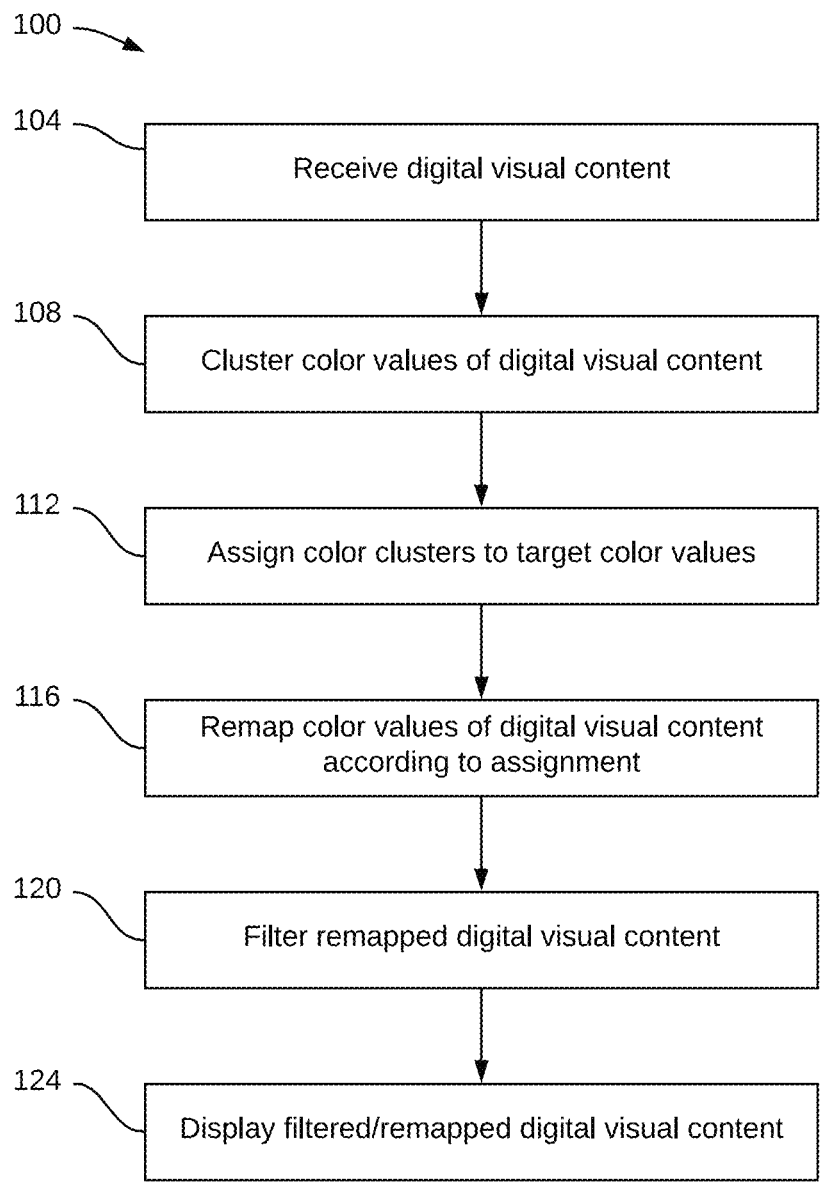
FIG. 5 illustrates a flowchart showing the operational steps of a method for remapping colors of a visual display content to improve viewing for a color vision deficient observer according to an example embodiment.

Referring now to FIG. 5, therein illustrated is a flowchart showing the operational steps of a method 100 for remapping colors of a visual display content to improve viewing for a color vision deficient observer according to an example embodiment. The method 100 may be carried out on the color vision deficiency viewing improvement system 1.

An effective class of color vision deficiency can be defined prior or during the carrying out of the method 100. It will be appreciated that the class of color vision deficiency can affect the clustering of colors (step 108) and the assignment of color clusters to target color values (step 112). For example, the class of color vision deficiency can be predefined (ex: a user can select a "color vision deficiency" setting in the settings of an electronic device).

At step 104, the digital visual content to be displayed is received. This receiving of the digital visual content may include detecting or identifying the ROI of the visual content. This detection may include separating digital visual content that are graphical elements (ex: charts, maps, rendered images, rendered videos, etc.) from digital visual content that are captured elements (ex: photographs, captured video). A digital visual content item may be identified by type (graphical element vs captured element) within a metatag associated to the item.

A digital visual content item may also be a mixed type item (ex: a webpage having photographs and graphical elements, a photograph having a graphical element overlay). The graphical elements may be distinguished from captured elements based on metadata associated to the mixed type digital visual content item (ex: a metatag identifies where the overlays are located).

According to an example embodiment, an image processing step can be applied to determine the ROI of the captured visual content to which color mapping is to be applied. The image processing step can include obtaining a color histogram of the mixed-type digital visual content and identifying peaks in the color histogram (ex: finding bins of the color histogram having a value that is greater than a predetermined threshold). The peaks of the color histogram represent ranges of color values that occur most frequently. Portions of the digital visual content having color values corresponding to the identified peaks are detected as being the ROI of the digital visual content. These frequently occurring ranges of color have a higher likelihood of corresponding to one or more graphical elements.

Returning back to FIG. 5, at step 108 of the method 100, the color values of the digital visual content are clustered into a plurality of color clusters. The clustering of the color values seeks to group each portion of the digital visual content having similar color values (ex: within a predetermined color JND) together into a respective color cluster. These portions can correspond to a plurality of regions of the digital visual content that each have similar color values. Each region may be a subarea of the digital visual content.

The set of color values that are present in the digital visual content (ex: the detected graphical element(s)) can be less than the full color gamut. The clustering therefore seeks to separate the color values and the subareas of the digital visual content having those color values into a plurality of color clusters.

The clustering may also group together within a same color cluster those color values of the set of present color values that have low visual distinguishability for a non-color vision deficient observer. For graphical elements, elements of the same or similar color values for a non-color vision deficient observer are typically not intended to be distinguishable and it was observed that clustering these color values together led to acceptable results when remapping.

The identifying of regions of similar color values can be carried out by applying a flood fill algorithm to the regions of interest of the visual digital content, in which each flood filled area corresponds to a subarea of the regions of interest having similar color values that are to be clustered within a same color cluster.

The clustering of the color values can further include defining a cluster-level color value for each cluster of color values. The cluster-level color value for a given cluster is representative of the color values found in that cluster and may be determined based on color values of the cluster.

Continuing with FIG. 5, at step 112, each color cluster formed at step 108 is further assigned to a respective one of a set of target color values. The set of target color values to be applied is determined or selected based on the defined class of color vision deficiency of the observer. The color values of the set of target color values have increased visual distinguishability for the given class of color vision deficient observer. Accordingly, mapping the color clusters to this set of target color values is intended to provide an improved viewing experience to the observer by reducing the number of colors that will cause confusion with another color. It will be appreciated that the assignment of color values of the digital visual content (ex: the detected graphical element(s)) to corresponding target color values define color mapping vectors for the color values of digital visual content. For each color value, its color mapping vector defines its corresponding target color value.

Various ways of selecting or defining the set of target color values and of assigning the color clusters to these target color values are described in more detail elsewhere herein.

At step 116, the color values present in the digital visual content (ex: the detected graphical element(s)) to be displayed are remapped to the set of target values according to the assignments defined at step 112. More specifically, for each color cluster, the color values of that color cluster are mapped to the target color value assigned to that color cluster. This mapping generates a color-mapped digital visual content. It will be appreciated that this color-mapped digital visual content is formed of color values that are visually distinguishable to the color vision deficient observer.

The mapping may be applied only to those color clusters that are in proximity of a color confusion line of the set of confusion lines for an observer of the defined class of color vision deficiency. Color values that are located sufficiently far from any confusion lines (ex: a predetermined number (ex: 2) of just-noticeable differences JNDs from any confusion lines) are omitted from the color re-mapping. It will be appreciated that color values that are sufficiently far from any confusion lines for a given class of color vision deficient observers will always be distinguishable for those observers.

In some embodiments, a further color conversion or color mapping may be applied to bring the color-mapped digital visual content into a color space that is suitable for displaying by the electronic display device 40. For example, the color-mapped digital visual content can be in the Lab color space, and it may be converted to RGB or HSV for display.

It will be understood that the assignment of color values to the set of target color values prioritizes having color values in the remapped images that will have high visual distinguishability for the given class of color vision deficient observer. For some color values, a lower importance may be put on ensuring that there is an identity or closeness between the color value of the pre-mapped digital visual content and the target color value of the mapped digital visual content. It was observed that this can lead to strong edges in the remapped digital visual content caused from adjacent regions of the remapped digital visual content having strong contrasting color values whereas the pre-mapped digital visual content had color values for these regions that had lower contrast. Accordingly, the method 100 may optionally include at step 120 filtering the mapped digital visual content to smooth edges having strong contrast.

At step 124, the mapped digital visual content is displayed on the electronic display device 48 for viewing by the color vision deficient observer.

Figure 6:
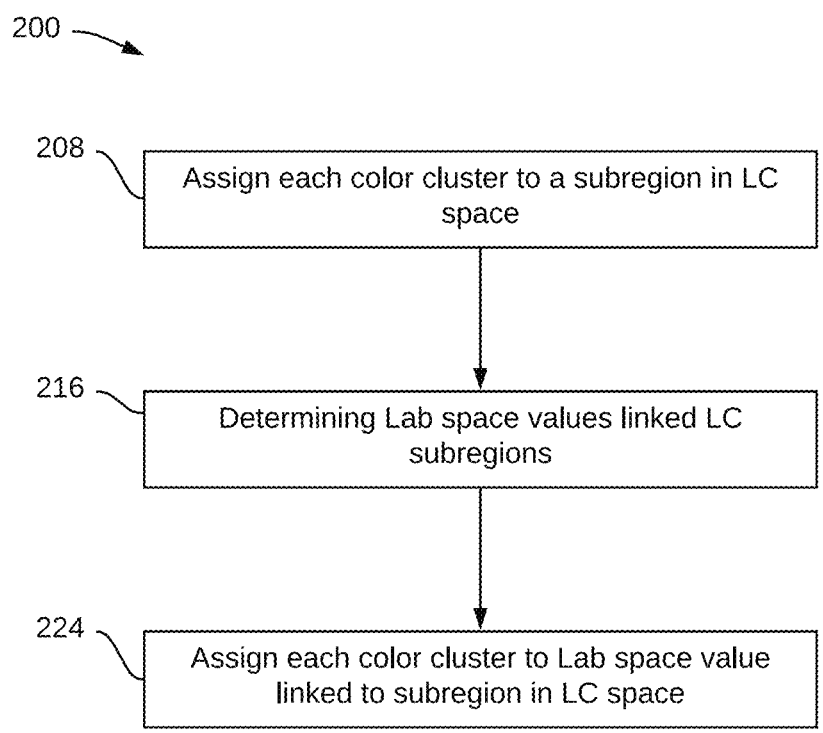
FIG. 6 illustrates a flowchart showing the operational steps of a method for assigning color clusters to a set of target color values according to one example embodiment.

Referring now to FIG. 6, therein illustrated is a flowchart showing the operational steps of a method 200 for assigning color clusters to a set of target color values according to one example embodiment. The method 200 corresponds to one way of carrying out step 112 of method 100.

At step 208, each color cluster determined at step 108 is assigned to a corresponding subarea in an intermediate color space.

The intermediate color space is a subspace that is structured to represent visual distinguishability for a color vision deficient observer. The intermediate color space is also adapted to the class of the color vision deficiency of the observer. More particularly, the intermediate color space is a perceptual color space that is defined according to characteristics of the class of the color vision deficiency. An intermediate color space can be defined for each class of color vision deficiency and the step 208 includes selecting the appropriate color space in accordance with the class of color vision deficiency of the observer.

According to one example embodiment, the intermediate perceptual color space is defined as a 2-dimensional space. A first axis of the 2-dimensional space corresponds to a one-directional color variation that is distinguishable for the given class of color vision deficient observer. This one-directional color variation can be determined by finding the direction that is generally perpendicular to the confusion lines for the given class of color vision deficient observer, and is denoted herein as a "c" channel. A second axis of the 2-dimensional space corresponds to a brightness channel. This channel can be a modified version of the brightness channel of the Lab color space, and is denoted herein as a "L" channel). Accordingly, the 2-dimensional space can be denoted as a "Lc" channel.

The assigning of color clusters of the non-mapped digital visual content to a corresponding subarea in an intermediate color space can be carried out so as to map the color clusters to their closest corresponding value in the Lc space while ensuring that there are no overlaps.

According to one example embodiment, the assigning is carried out by assigning each of the color clusters sequentially. For a first color cluster of the sequence, the sub region having a position in the Lc space corresponding to the cluster-level color value for the color cluster is assigned to that cluster, thereby resulting in an identity matching. This is repeated for subsequent color clusters while ensuring no overlap in the Lc space. For example, for a subsequent cluster having a cluster-level color value that would occupy an overlapping subregion in the Lc space, a nearby unoccupied subregion that is sufficiently remote from the already occupied region is assigned to that subsequent cluster.

The subregions of intermediate color space may be defined in advance of assigning the color clusters (i.e. that the intermediate color space is divided into subregions ahead of the assigning). Accordingly, when assigning the color clusters, each color clusters is uniquely assigned to one of the predefined subregions.

Alternatively, the subregions of the intermediate color space may be defined "on-the-fly" during assignment of the color clusters. Accordingly, when sequentially assigning the color clusters, a subregion is defined for the first cluster. For a subsequent cluster, another subregion is defined while ensuring no overlapping with any subregion that has already been defined.

Continuing with FIG. 6, the method 200 may further include determining, at step 216, a target color value for each subregion in the intermediate color space. The target color value can be in the same color space as the clusters of color values determined at step 108. According to one example embodiment, the target color value to be associated for a given subregion is a color value that closely matches (ex: that presents a nearest match without falling into another subregion) the cluster-level color value that was assigned to the given subregion. This determination may be carried out by following along a given confusion line to a given color value that closely matches (ex: is a nearest match) to the cluster-level color value.

Alternatively, where the subregions of the intermediate color space are predefined, the target color value associated to each subregion of the intermediate color space can also be predefined.

At step 224, the target color value that is associated to each subregion of the intermediate color space is further assigned to the color cluster assigned to that subregion. It will be appreciated that this forms the assignments of color clusters determined at step 108 to the set of target color values. Step 224 can be the same step as step 112 of method 100.

According to another method for carrying step 112 of assigning color clusters to a set of target values, a palette of predetermined color values is selected based on the given class of color vision deficiency of the observer. The color values of the palette have been specifically selected to be visually distinguishable for the given class of color vision deficiency.

According to one example embodiment, the palette of predetermined color values for a given class of color vision deficiency is built by extending a standard palette adapted for that class. This standard palette can be a 15-color palette, such as the one from Krzywinski, "Color Palettes for Color Blindness" (available: mkweb.bcgsc.ca/colorblind/). The extending of the standard palette includes a larger set of color values that are visually distinguishable for the observer but without necessarily ensuring a coherence between subsets of this larger set.

In one example embodiment, the standard palette can have more than 20 visually distinguishable color values.

In another example embodiment, the standard palette can have more than 25 visually distinguishable color values.

The standard (ex: 15-color) palette can define a plurality of subset of color values. Each subset of color values has at least two colors from the full color gamut. When perceived by an observer of a given class of color vision deficiency, the color values of any subset would be visually distinguishable for the observer in relation to the perception of the color values of any other subset. Furthermore, the color values of the same subset will be perceived by an observer to be similar but may be distinguishable in some circumstances.

Figure 7:
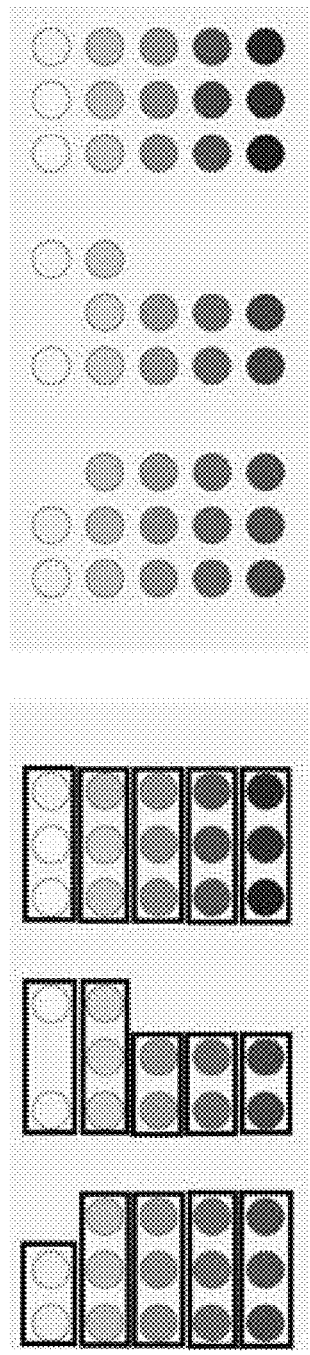
FIG. 7 illustrates a 15-color palette adapted for a deutan class of color vision deficient observers.

FIG. 7 illustrates a 15-color palette from Krzywinski adapted for a deutan class of color vision deficient observers. Each box of color values corresponds to a subset of color values that will be perceived similarly by the deutan observer.

Figure 8A:
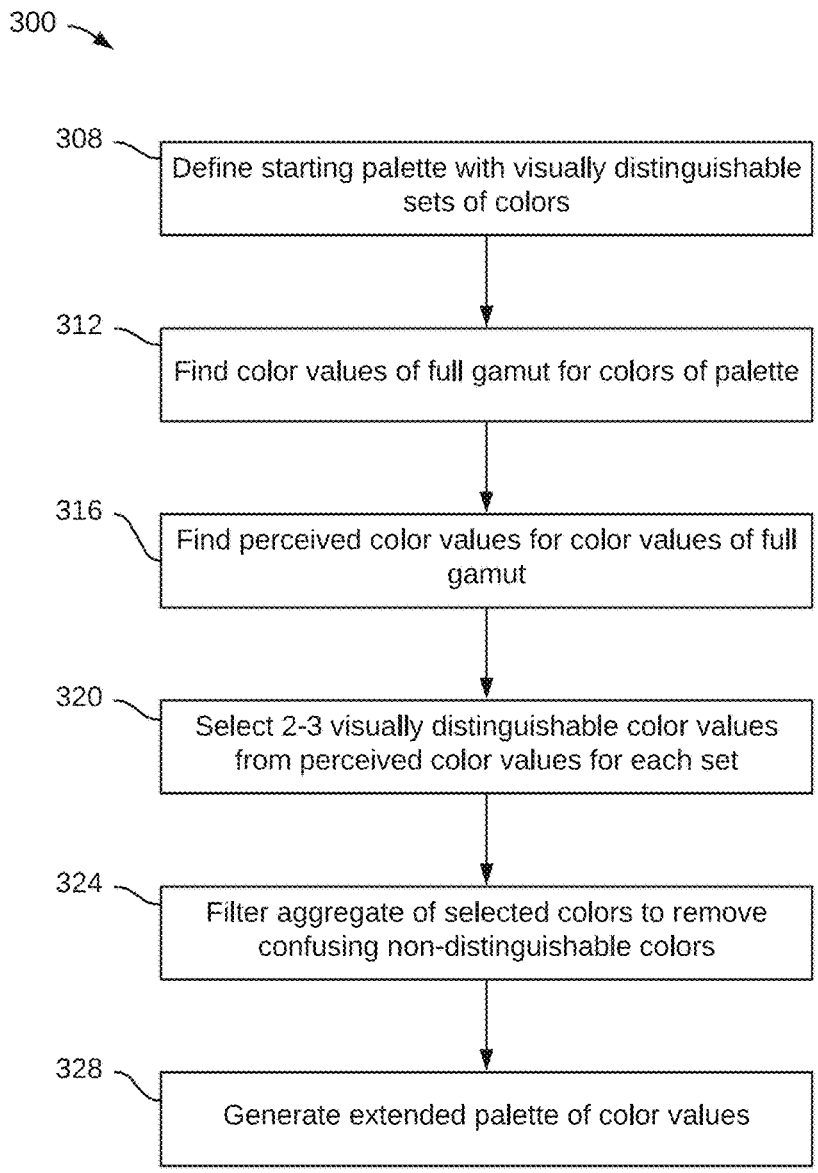
FIG. 8A illustrates a flowchart of the operational steps of a method for extending a standard palette of colors to obtain an extended palette suitable for a given class of color vision deficient observers, according to an example embodiment.

Referring now to FIG. 8A, therein illustrated is a flowchart of the operational steps of a method 300 for extending a standard palette of colors (ex: the 15-color palette from Krzywinski) to obtain an extended palette suitable for a given class of color vision deficient observers, according to an example embodiment. The method can be useful to obtain a palette of colors that will be visually distinguishable for the given class of color vision deficient observer and in which the number of colors is greater than the initial standard palette.

At step 308, a starting palette with a visually distinguishable set of colors is defined. The starting palette can be a palette of subset of color values (such as one of the Krzywinski 15-color palettes) suitable for that class of color vision deficient observers.

Figure 8B:
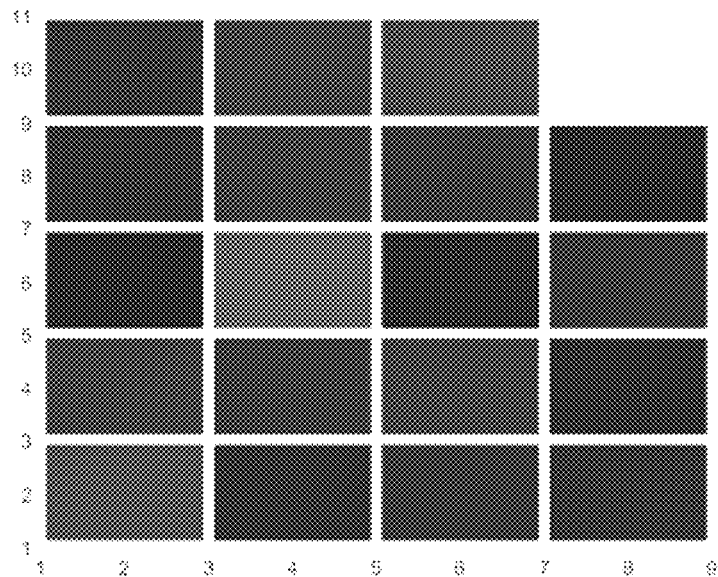
FIG. 8B illustrates a working set of color values for a given subset of color values of the starting palette according to an example embodiment.

At step 312, for each visually distinguishable subset of colors, a working set of color values is defined for the subset. This working set of color values is defined by finding color values in the full color gamut that are similar to the full color gamut color values of the given subset. The color values to be included in the working set can be determined by finding color values that are within a predetermined spatial distance of any color value of the subset in the color space. FIG. 8B illustrates a working set of color values for a given subset of color values of the starting palette according to an example embodiment.

Figure 8C:
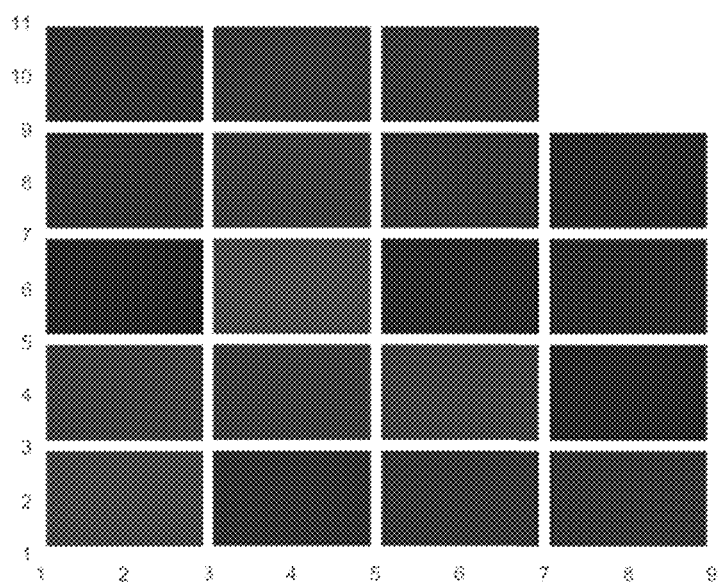
FIG. 8C illustrates a working set of perceived color values determined from the working set of color values of FIG. 8B.

At step 316, for each working set of color values defined at step 312, a corresponding working set of perceived color values is determined. This may be carried out by determining, for each color value of the working set, the perceived color value for that color value, corresponding to how the observer of the given class of color vision deficiency would perceive that color value. The perceived color value can be obtained by applying a simulation of how the observer of the given class of color vision deficiency would perceive the color. The simulation may be a Brettel Simulation. FIG. 8C illustrates a working set of perceived color values determined from the working set of color values of FIG. 8B.

At step 320, for each working set of perceived color values determined at step 316, select at least two color values that are visually distinguishable from one another (i.e. would be, based on the simulated perception, distinguishable for the color vision deficient observer). This selection can be carried out heuristically.

It will be appreciated that the aggregate of color values selected from the working sets of perceived color values across all of the visually distinguishable subsets of color values form a working palette of visually distinguishable perceived color values.

At step 324, the working palette of visually distinguishable perceived color values are filtered to remove perceived color values that have low distinguishability for the given class of color vision deficient observer relative to any other perceived color value of the working palette. That is, duplicate color values, as perceived by the color vision deficient observer, are removed.

The filtering can be carried out by displaying the working palette of visually distinguishable perceived color values and heuristically removing color values that appear similar according to a visual inspection.

The filtering can also include identifying sets of perceived color values of the working palette of visually distinguishable perceived color values that are located on a same confusion line within the full gamut color space (ex: Lab color space) for the given class of color vision deficiency. For any set of perceived color values located on the same confusion line, only one perceived color value is kept and the remainder of the set is filtered out.

At step 328, the extended palette of predetermined color values is generated by determining for each perceived color value of the filtered working palette of visually distinguishable perceived color values, the color value in the full color gamut corresponding to that perceived color value. This extended palette of predetermined color values represents the set of usable target values to which the color clusters of the digital visual content can be mapped.

Figure 8D:
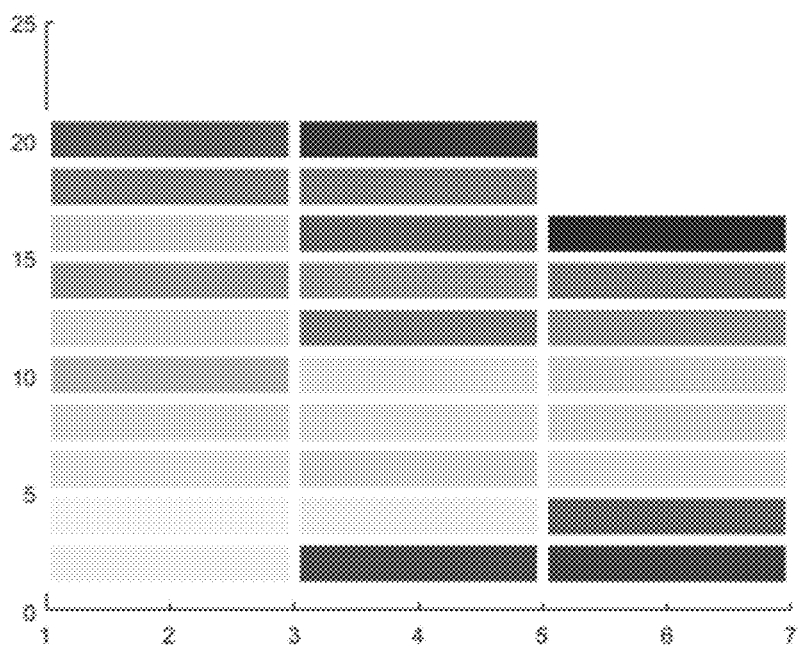
FIG. 8D illustrates one extended palette of predetermined color in the full gamut color space for a deutan.

FIG. 8D illustrates one extended palette of predetermined color in the full gamut color space for a deutan class of color vision deficient observer.

Figure 8E:
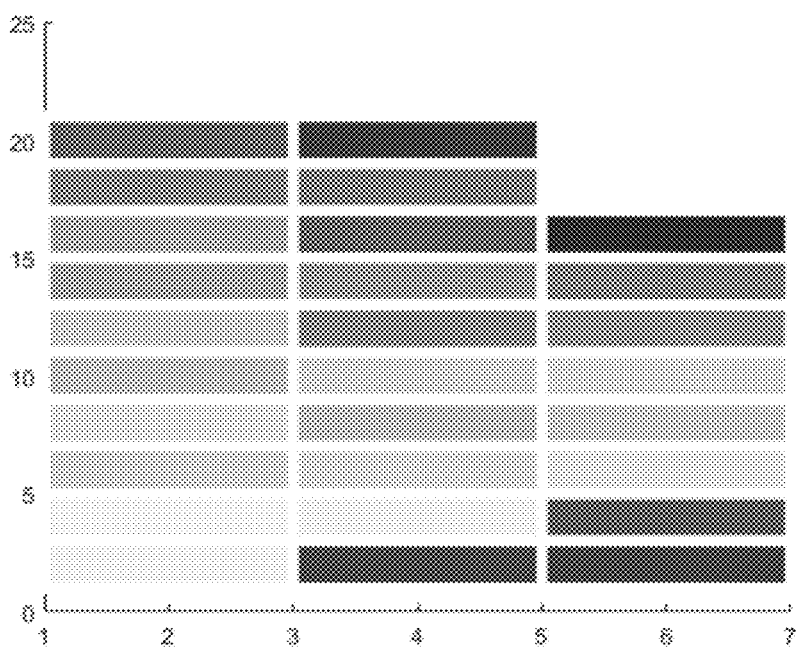
FIG. 8E illustrates the extended palette of predetermined colors as perceived by an observer of the deutan class according to a simulation.

FIG. 8E illustrates the extended palette of predetermined color as perceived by an observer of the deutan class according to a simulation.

An extended palette of predetermined color values can be generated for each class of color vision deficient observers. The extended palettes can be stored at the color vision deficiency viewing improvement system 1 and selected when assigning the color clusters to target color values.

When assigning the color clusters to the set of target color values at step 112, the assignment can proceed by assigning to each color cluster a target color value of the palette having a color value that is most similar in color to the cluster-level color value for that cluster. The most similar color value of the palette can be the color value that is nearest in distance in the color space to the cluster-level color value within the color space. According to an example embodiment, when determining the distance in the color space, a greater weight may be attributed to the luminance component than to the chroma component.

Figure 9:
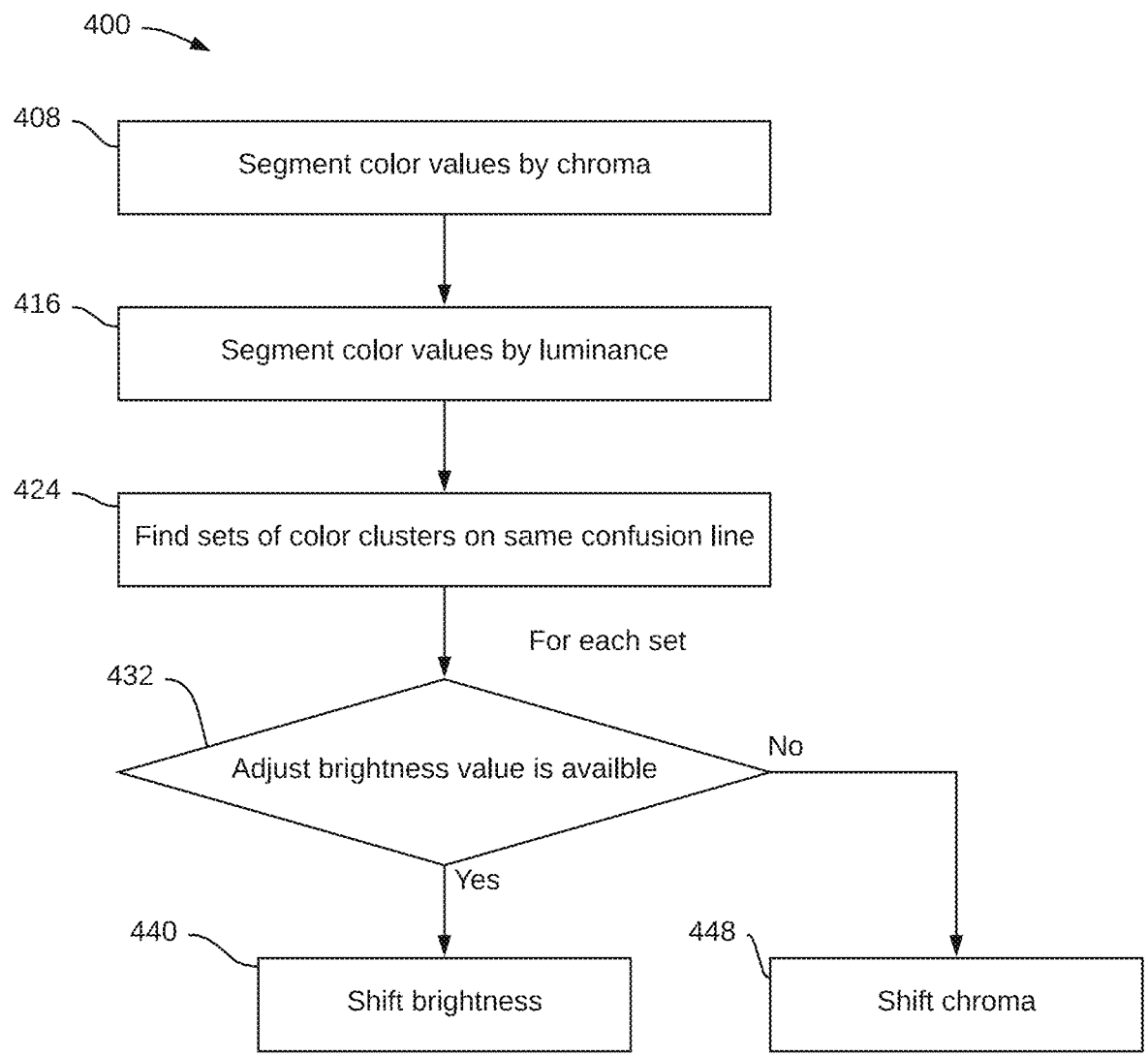
FIG. 9 illustrates a flowchart showing the operational steps of a method for clustering color values and assigning color clusters to a set of target color values according to one example embodiment.

Referring now to FIG. 9, therein illustrated is a flowchart showing the operational steps of a method 400 for clustering color values and assigning color clusters to a set of target color values according to one example embodiment.

At step 408, the color values of the digital visual content are first clustered by chroma to generate a first intermediate set of color clusters. For example, the digital visual content (ex: the detected graphical elements) are received, or converted to, Lab color space, and the first clustering is applied based on a and b values of the color values.

At step 416, the color clusters of the first intermediate set are further separated by brightness. This generates the plurality of color clusters at step 112 that are further assigned to target color values at step 116 of method 100. For example, when in the Lab color space, the further separating is carried out based on L values in the Lab space. The steps 408 and 416 correspond to yet another way of carrying out step 112 of method 100.

At step 424, sets (ex: pairs) of color clusters having cluster-level color values located on a same confusion line for the given class of color vision deficient observer and also having a same brightness value are identified. It will be appreciated that these color clusters have color values that would not be visually distinguishable when perceived by the color vision deficient observer.

At step 432, for each pair determined at step 424, it is determined whether an adjusted brightness value is available. An adjusted brightness value is determined to be available if there is not another color cluster along the same confusion line as the pair that also has that adjusted brightness value.

If an adjusted brightness value is available, the method 400 proceeds to step 440 to adjust the brightness value of cluster-level color value for one of the pair of color clusters determined at step 424. The brightness value of this color cluster is adjusted to the adjusted brightness value determined at step 432. It will be appreciated that that the color value having the adjusted brightness value becomes the target color value for that color cluster and the adjusting to that brightness value causes the mapping of that color cluster.

If an adjusted brightness value is not available, the method 400 proceeds to step 448 to adjust the chroma for one of the pair of color clusters determined at step 424. It will be appreciated that the color value having the adjusted chroma value becomes the target color value for that color cluster and the adjusting to that chroma value causes the mapping of that color cluster.

It will be understood that the other color cluster of the pair is not adjusted. Accordingly, its target color value is its original cluster-level color value.

Similarly, it will be understood that color clusters having cluster-level color values that are not located on a confusion line, or that are not located on the same confusion line as another color cluster will not be remapped.

Alternatively, the original cluster-level color value for that color cluster can be set as its target color value.

It will be appreciated that the example method 400 prioritizes maintaining the chroma values of the original digital visual content. If necessary to avoid confusion, the brightness value is adjusted but the chroma value is maintained. The chroma value is adjusted only if adjusting the brightness value is not sufficient to avoid confusion.

Trial Implementation 1

A first trial implementation was carried out based on the exemplary method 100 and the exemplary method 200 described herein.

Figure 10:
FIG. 10 shows an example taken from the home page of USA Today™ in which the regions of interest identified by a 3-D histogram of RGB colors are highlighted.

FIG. 10 shows an example taken from the home page of USA Today™ in which the ROI identified by a 3-D histogram of RGB colors are highlighted. In this case, neutral (gray) pixels were ignored, so as not to overwhelm the algorithm with text and other elements that are unlikely to be problematic.

Similar colors in the ROI are identified and clustered together. For this step, a 3-D flood fill algorithm with voxels sized by 2.0 JND steps in CIELAB color space was used. A more sophisticated clustering method such as K-means could be used, but in this case it was more important to keep indistinguishable regions together, which a 3-D flood fill achieves directly.

It was assumed that the implementation is to be applied to pure dicromats—individuals who are completely missing one type of color cone. This simplifies the technique while guaranteeing that colors left that are distinguishable by a full dicromat will also be distinguishable for color anomalous observers of the same class.

The main requirement for remapping clusters for a deficient observer is to develop an appropriate perceptual color space. For each of the three classes of color deficiency, the implementation defined a 2-dimensional "Lc" perceptual space. The "L" channel corresponds to a modified version of the Lab brightness channel, and the "c" channel is the one-dimensional color variation the observer sees clearly (i.e., the direction perpendicular to the "confusion lines").

For the "c" channel, the implementation measured the positive or negative angle between a given CIE (x',y') chromaticity and the neutral wavelength as seen from the copunctual point (The neutral wavelength is the pure color that matches white for a dichromat. The copunctual point is the CIE xy point where lines of confusion converge). This angle is normalized by the number of JNDs visible over the spectrum, then multiplied by the standard Y channel times the distance from the copunctual point, both raised to the $\frac{1}{3}$ power. The modified L channel is this final factor times 100.

TABLE 1

Characteristics of three types of cone deficiency.

| CB Type | Copunctual Point CIE (x, y) | Neutral Wavelength | JNDs visible over spectrum |
|---|---|---|---|
| Protan | (0.7635, 0.2365) | 492 nm | 21 |
| Deutan | (1.400, −0.400) | 498 nm | 31 |
| Tritan | (0.1748, 0.000) | 570 nm | 44 |

In mapping the clusters, the implementation first maps them into Lc color space, filling a 2-D bitmap corresponding to JNDs in the reduced space. A simple greedy algorithm was employed, so the first cluster will automatically get its preferred spot in the Lc table, which corresponds to the identity mapping. The next cluster and others that follow may need to shift to accommodate Lc colors that came before them, and each color also claims the spaces immediately adjacent to ensure the remapped values are distinct from one another.

The number of spaces available depends on the type of dichromat. Protans have the most limited perceptual space, followed by deutans, with tritans having the largest. Even so, a pure tritanope sees perhaps 5% as many colors as a normal observer. This is why it helps to work with only a small palette of colors corresponding to graphical elements (ex: about 30 to 40 colors).

Once the color clusters are placed into unique Lc slots, these need to be mapped back to Lab (and finally RGB) color space. A method that follows along a given Lc value's confusion line to the Lab color nearest the original value was used. This is implemented as a binary search in a sorted list of confusion colors lying along the least sensitive channel in Lab space (i.e., "a" for red-green colorblind observers and "b" for blue-yellow colorblind).

Finally, a mapping from each original Lab cluster center through a dedicated spot in Lc space and back to the nearest corresponding Lab color was obtained. This ends up as a Lab vector that is then applied to every color belonging to that cluster taken from the graphics element mask of the original image.

Below is the trace output of the color remapping tool applied to the USA Today web page for a protanope, indicating which color clusters are modified and how. Note that many of the colors move little or not at all, because there was no conflict to begin with:

```
irys_mapCB-v-bp             USAToday1.{tif,bmp}
  USAToday1protan.tif
panimage.cpp@184>trace:     Reading    image
  'USAToday1.tif'
mapColorblind.cpp@129>info: Mapping 9 color clusters
mapColorblind.cpp@182>trace: Lab (51,43,61)⇒(51,43,
  61)
mapColorblind.cpp@182>trace: Lab (35,56,49)⇒(35,56,
  49)
mapColorblind.cpp@182>trace: Lab (42,70,38)⇒(43,70,
  39)
mapColorblind.cpp@182>trace: Lab (44,69,37)⇒(47,69,
  38)
mapColorblind.cpp@182>trace: Lab (47,76,32)⇒(54,76,
  33)
mapColorblind.cpp@182>trace: Lab (46,-49,31)⇒(46,-
  49,31)
mapColorblind.cpp@182>trace: Lab (30,57,-40)⇒(30,
  57,-40)
mapColorblind.cpp@182>trace: Lab (48,-6,-42)⇒(48,-
  6,-42)
mapColorblind.cpp@182>trace:  Lab  (66,-11,-52)⇒
  (66,-11,-52)
panimage.cpp@346>trace: Writing TIFF LZW RGB
  image 'USAToday1protan.tif'
```

Figure 11A:
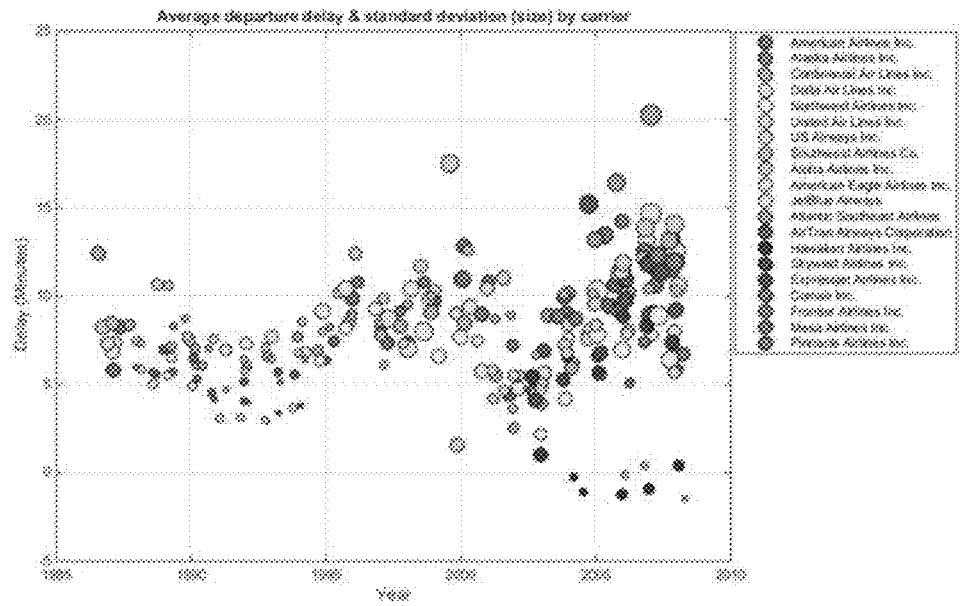
FIGS. 11A and 11B illustrate the result of applying remapping according to the first implementation to the graphical plots of FIGS. 3A and 3B.
Figure 11B:
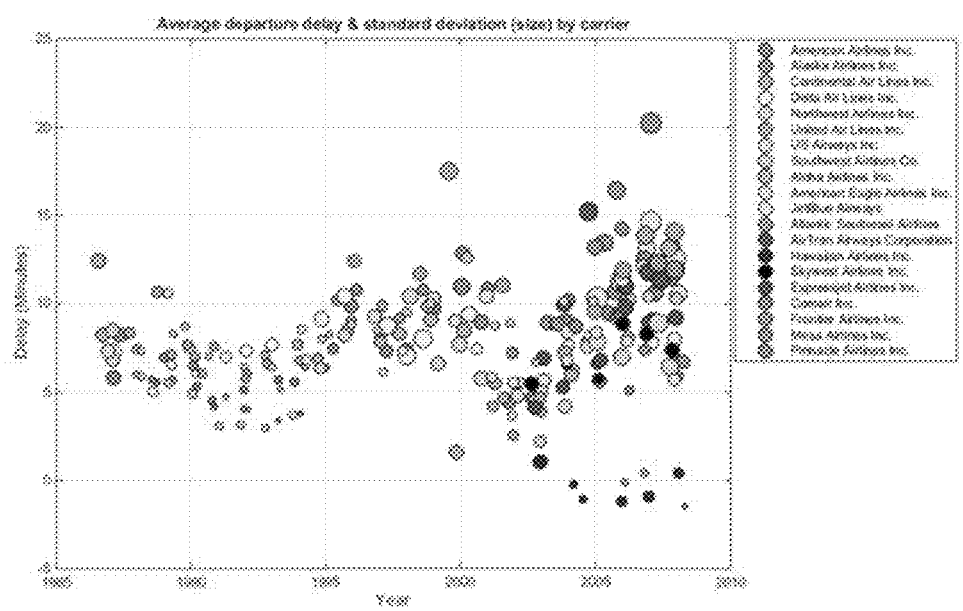

FIGS. 11A and 11B illustrate the result of applying remapping according to the first trial implementation to the graphical plots of FIGS. 3A and 3B.

Figure 12:
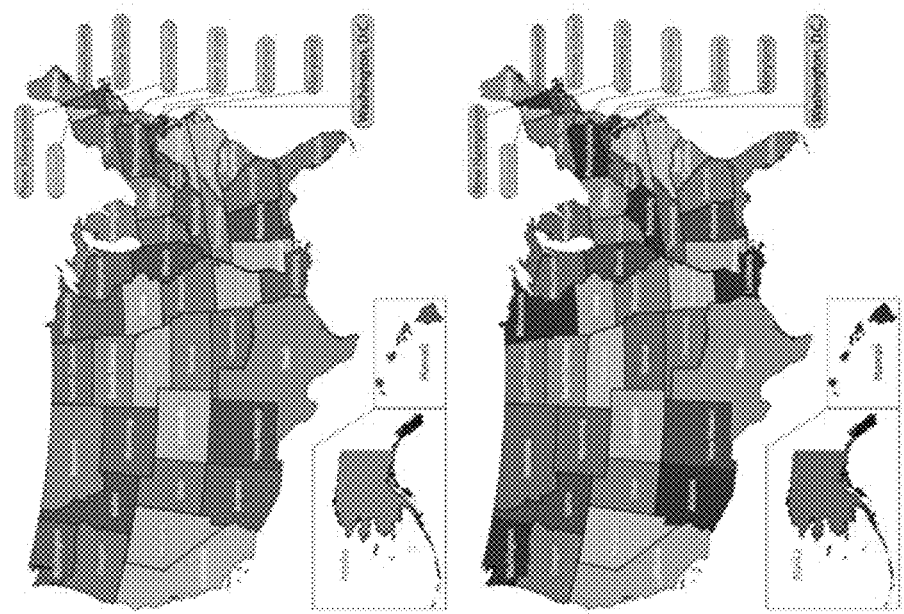
FIG. 12 illustrate other results of applying remapping according to the first implementation.
Figure 12:
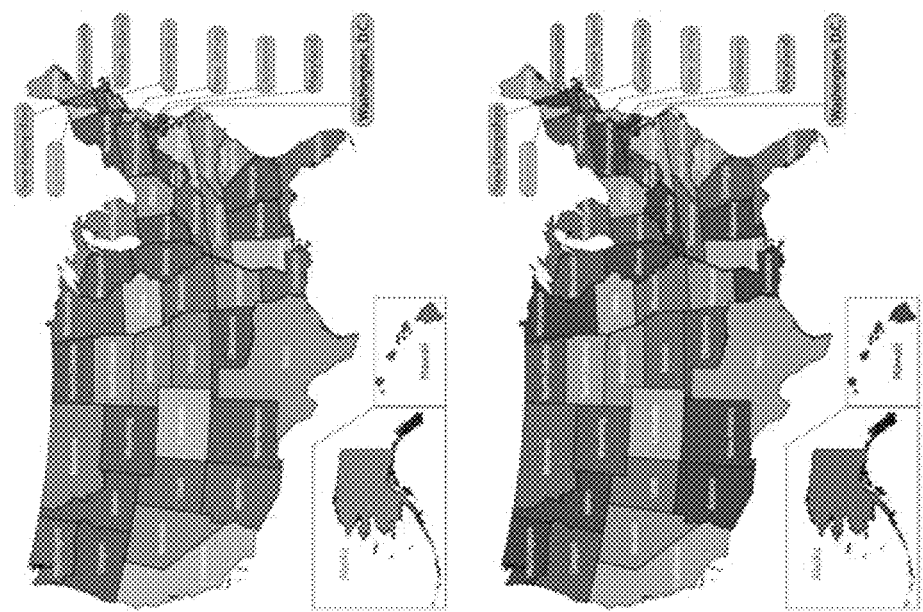

FIG. 12 illustrate other results applying remapping according to the first implementation.

Trial Implementation 2

In a second trial implementation, a 15-color palette (FIG. 7) from Krzywinski was extended to a 28-color palette according to the exemplary method 300.

The following steps were carried out in the second trial implementation:

1-Assuming the entire color gamut, colors that are similar to the colors in one row (class) of the 15-color palette are picked: Colors with $\Delta E<10$ to each color of one row of the palette will be classified in the same class (FIG. 8B illustrates the colors picked for one row).

$$\Delta E = \sqrt{(L_2-L_1)^2 + (a_2-a_1)^2 + (b_2-b_1)^2}$$

2-Applying Brettel simulation method on the colors in each class (FIG. 8C shows the corresponding colors as perceived by the color vision deficient observer according to the Brettel simulation).

3-Finding 2-3 distinguishable colors in the Brettel simulated color set of a specific class.

4-Finding the original color of the color that were picked in Brettel simulated colors.

5-Displaying all selected colors over 15 classes in a single chart and apply Brettel method on them.

6-Removing the colors that are similar (non-distinguishable) to dichromat people.

7-Displaying remaining colors in the color chromaticity diagram and draw the confusing color lines that pass each of these colors (for a specific type of deficiency).

8-If there is any color that appears on a single confusing color line, removing them.

FIG. 8D illustrates the extended palette in the full color gamut.

FIG. 8E illustrates the extended palette as perceived by the color deficient observer.

Figure 13:
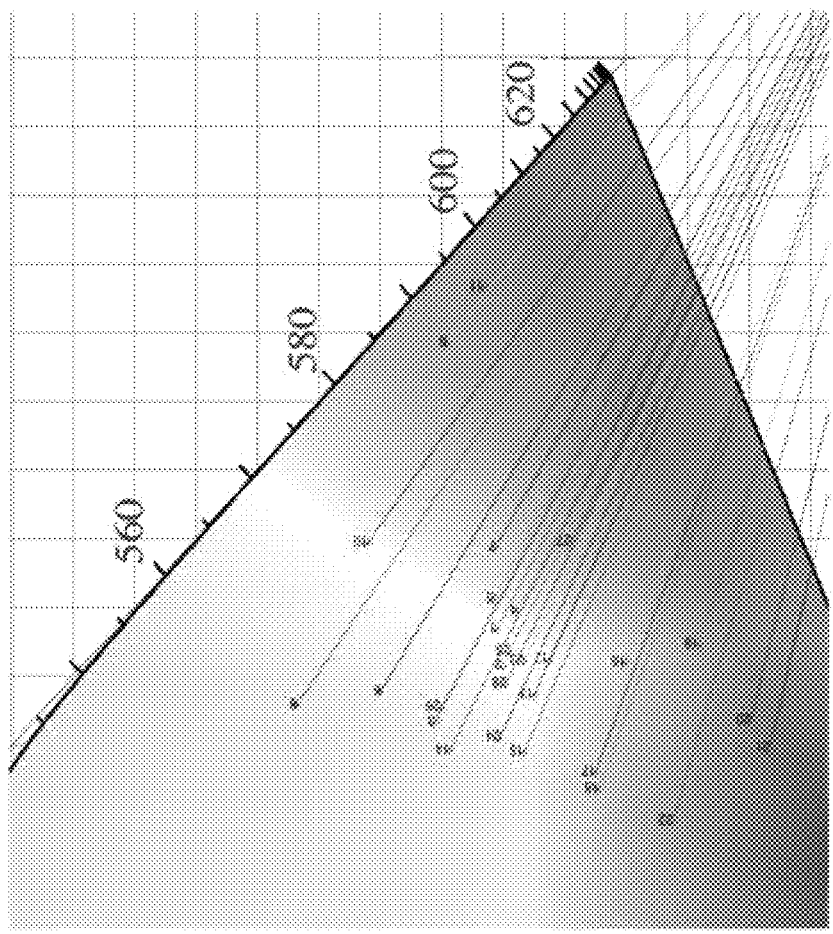
FIG. 13 illustrates the confusion lines of the extended palette of the second trial implementation.

FIG. 13 illustrates the confusion lines of the extended palette.

Figure 14:
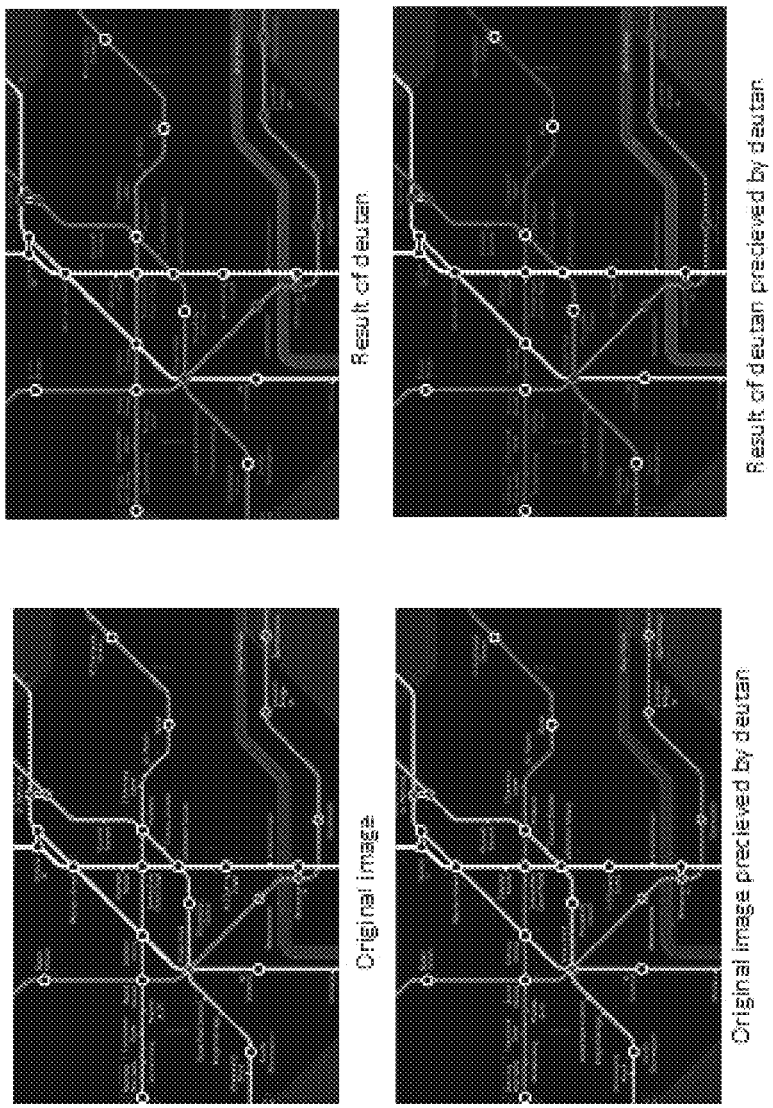
FIG. 14 illustrates the result of applying color mapping using the extended palette for a navigation interface in an automobile.

FIG. 14 illustrates the result of applying color mapping using the extended palette for a navigation interface in an automobile.

Figure 15:
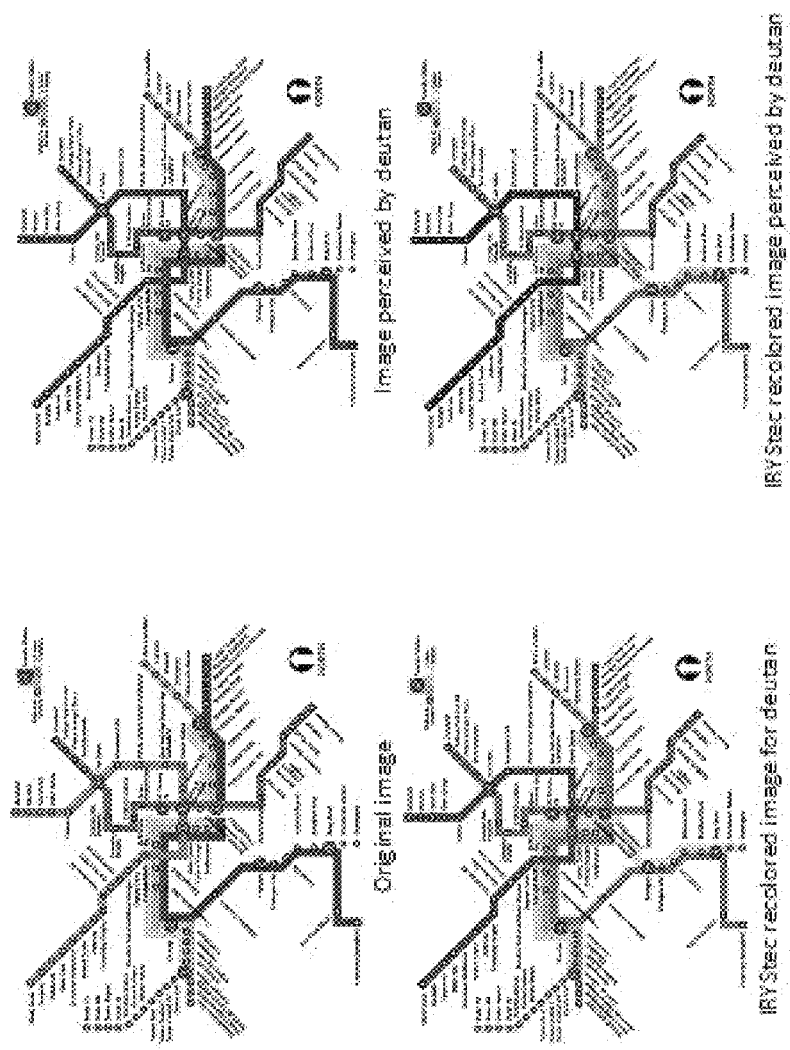
FIG. 15 illustrates the result of applying color mapping using the extended palette for a subway map.

FIG. 15 illustrates the result of applying color mapping using the extended palette for a subway map.

As part of the second trial implementation, it was explored how weighting of luminance value affected the selection of an appropriate target color value (a color within the extended palette) for a given color cluster.

In color assignment process, the closest color to the original color will be chosen from the color palette. The similarity will be calculated as follow:

$$\text{Similarity}_{(original\_color, palette\_color)} = \sqrt{(L_2-L_1)^2 + (a_2-a_1)^2 + (b_2-b_1)^2}$$

In alternative color assignment process, a larger weight was given to the Luminance channel to choose the color with most relevant luminance to the original image.

$$\text{Similarity}_{(original\_color, palette\_color)} = \sqrt{(L_2-L_1)^2 + (a_2-a_1)^2 + (b_2-b_1)^2}$$

Figure 16:
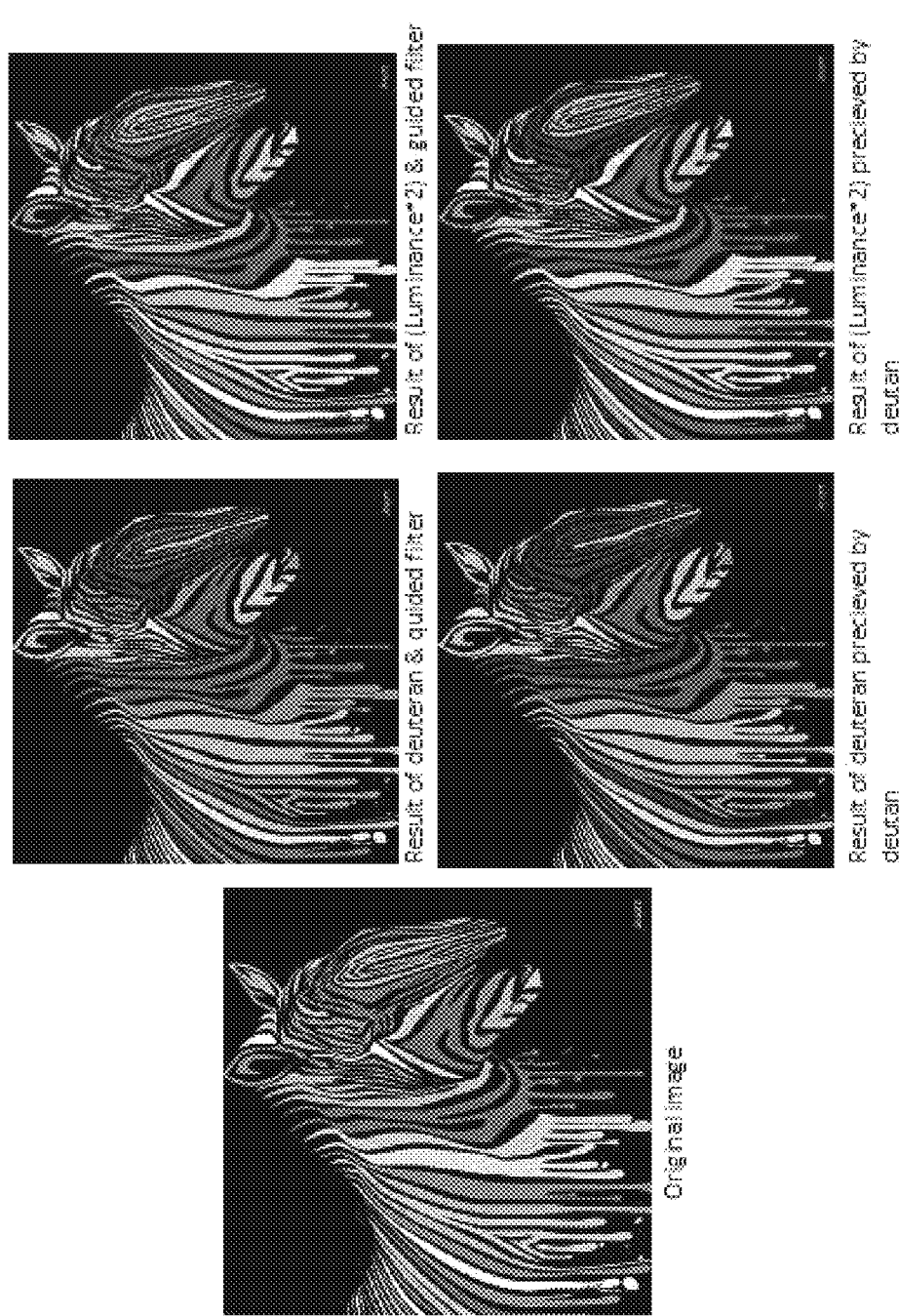
FIG. 16 illustrates the remapping result when applying different weights to the luminance channel.

FIG. 16 illustrates the remapping result when applying different weights to the luminance channel.

A subjective evaluation has been done comparing the proposed algorithm with two color blindness features available in smartphone operating system. The subjective evaluation consists of three parts: Calibration, Testing the new algorithm, and Comparison between the proposed algorithm, and the two other color blindness features with the maximum intensity level. Specifically, how well the method makes confusing colors distinct for color deficient individuals compared to techniques currently available in smartphones.

Figure 17:
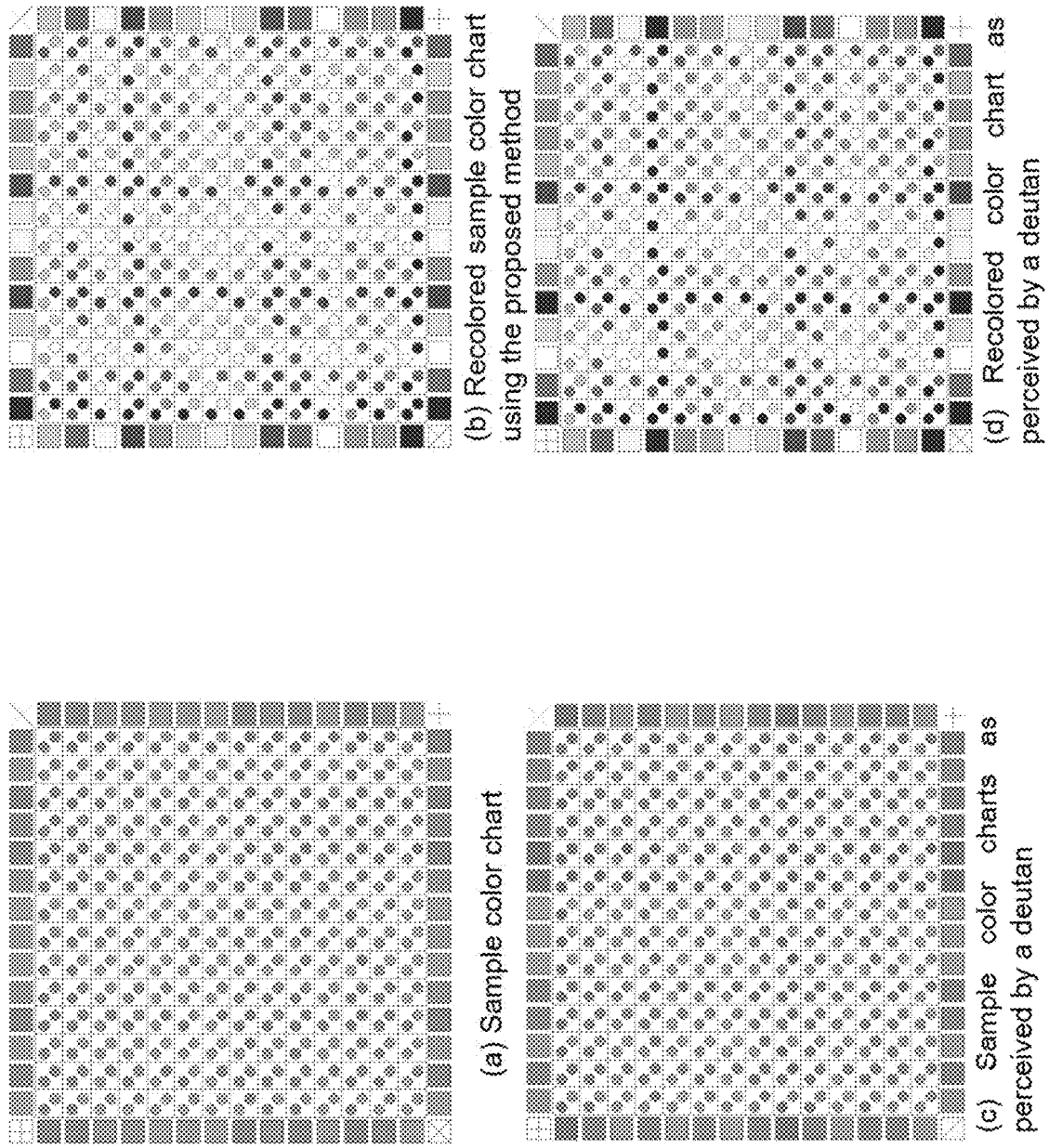
FIG. 17 shows a comparison between a sample color chart with 14 colors and its recolored version using the method of the second trial implementation as perceived by a deutan observer.

FIG. 17 shows a comparison between a sample color chart with 14 colors and its recolored version using the method of the second trial implementation as perceived by a deutan observer.

Figure 18:
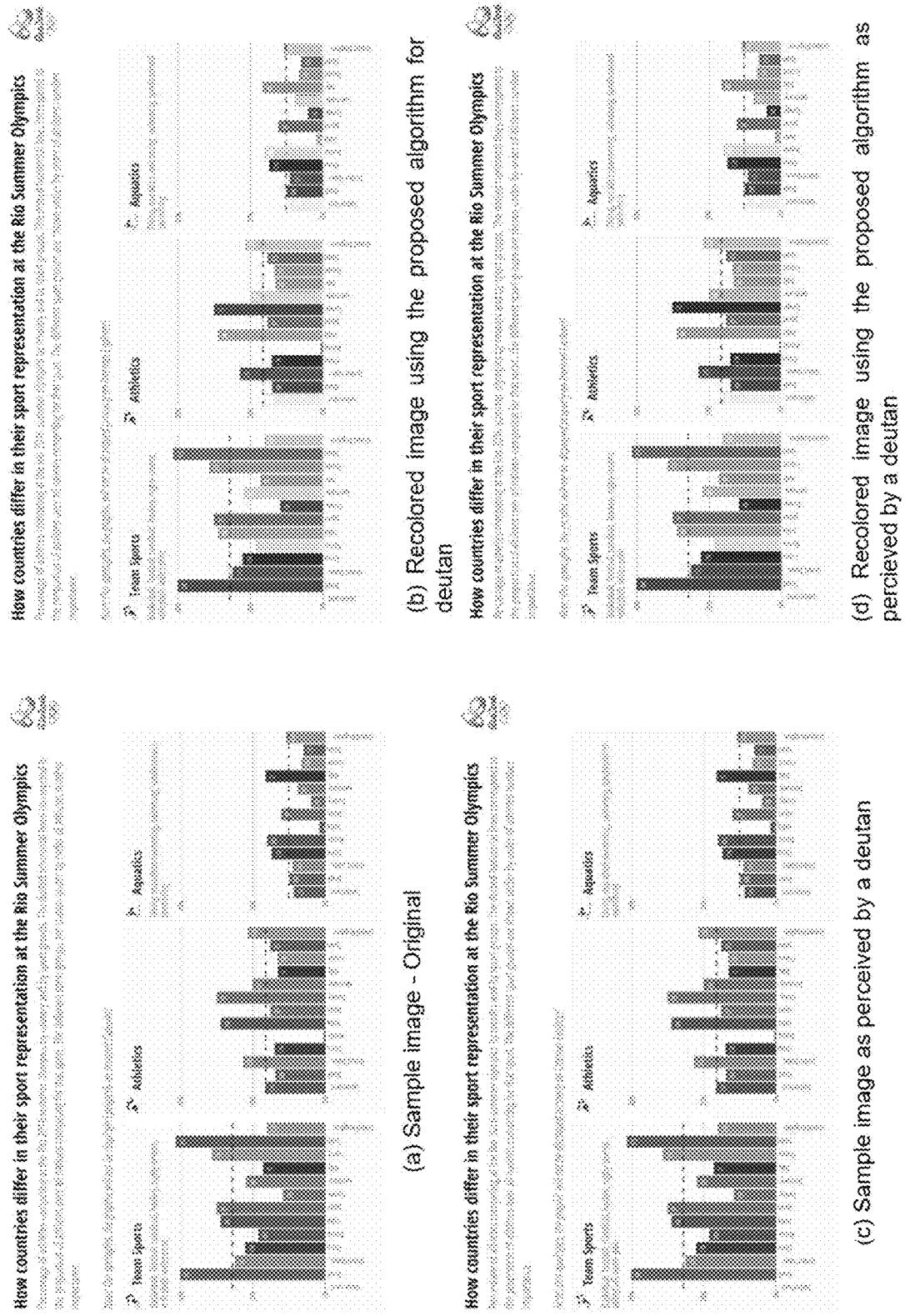
FIG. 18 shows a comparison of a graphical chart and its recolored version using the method of the second trial implementation as perceived by a deutan observer.

FIG. 18 shows a comparison of a graphical chart and its recolored version using the method of the second trial implementation as perceived by a deutan observer.

TABLE 1

Comparison between the number of wrong selections of the same color over the two images for the proposed method, method A and Method B for colorblindness compensation on operating system level

| | Original image (results over image 1 & 2 in total) # of boxes with distinguishable color that are selected as the same color | Proposed method (results over image 1 & 2 in total) # of boxes with distinguishable color that are selected as same color | Ratio of the wrongly selected boxes using the proposed method over the original image | Method A (results over image 1 & 2 in total) # of boxes with distinguishable color that are selected as same color | Ratio of the wrongly selected boxes using method A over the original image | Method B (results over image 1 & 2 in total) # of boxes with distinguishable color that are selected as same color | Ratio of the wrongly selected boxes using method B over the original image |
|---|---|---|---|---|---|---|---|
| Subject# 1 | 22 | 0 | 0 | 39 | 1.70 | 12 | 0.54 |
| Subject# 2 | 14 | 0 | 0 | 20 | 1.40 | 7 | 0.50 |
| Subject# 3 | 24 | 2 | 0.08 | 7 | 0.29 | 11 | 0.45 |

Trial Implementation 3

A third trial implementation was carried out according to the example method 400 described herein.

Figure 19:
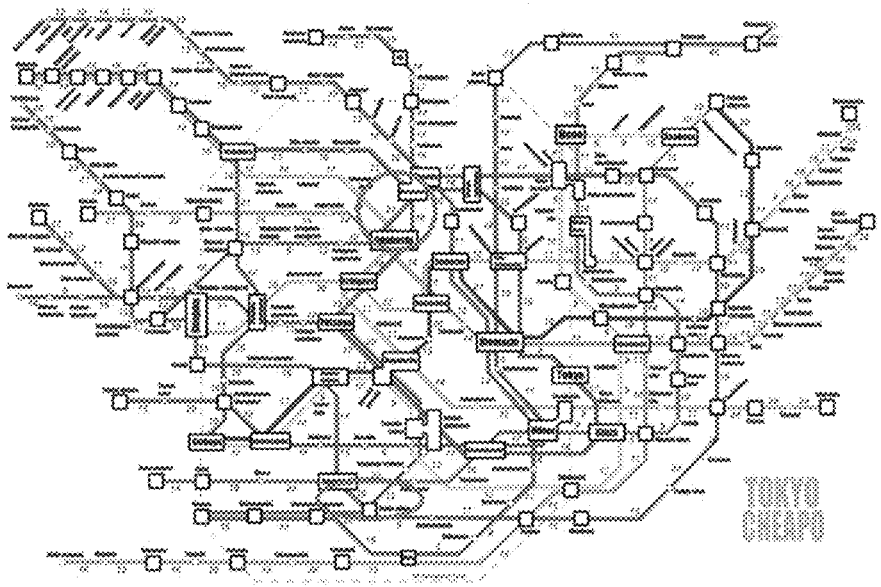
FIG. 19 shows two maps without the color remapping.
Figure 19:
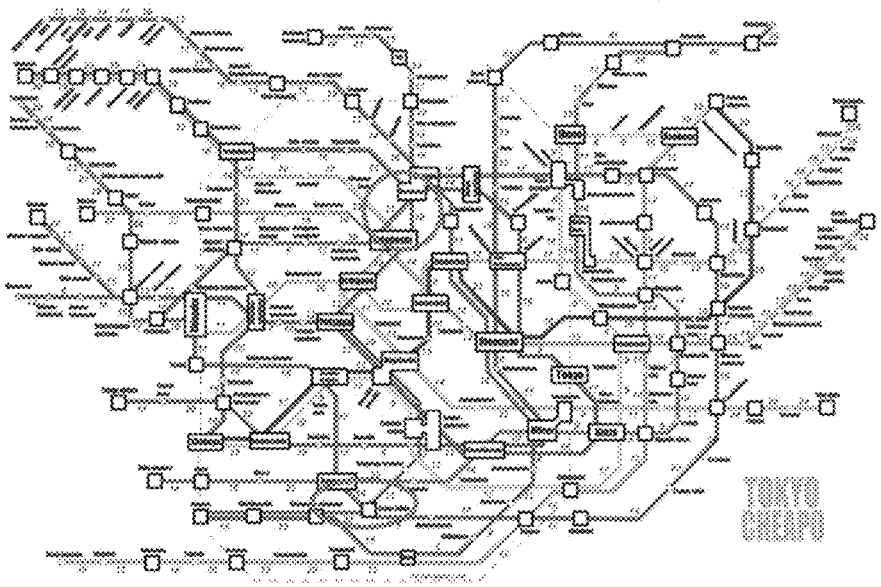

FIG. 19 shows two maps without the color remapping described herein according to methods 100 and 400.

Figure 20:
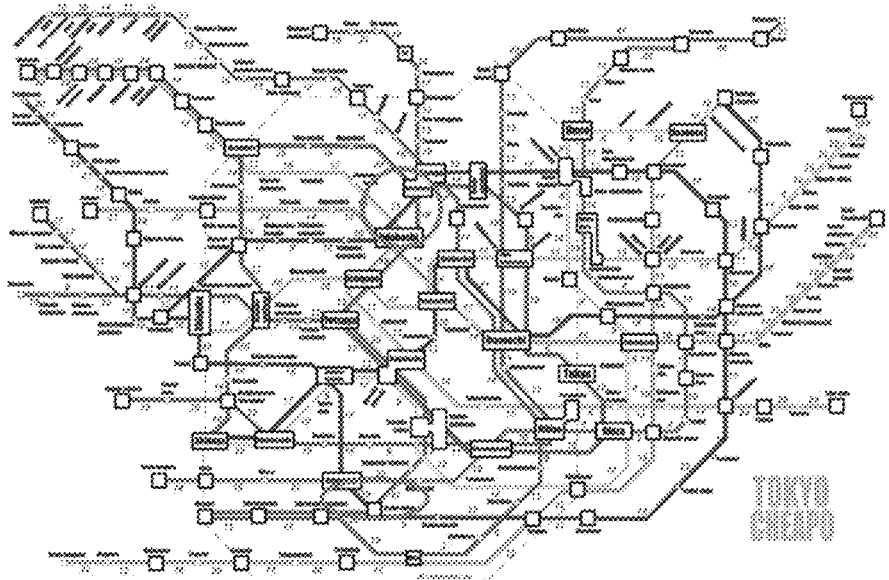
FIG. 20 shows the result of applying the color mapping according to a third trial implementation.
Figure 20:
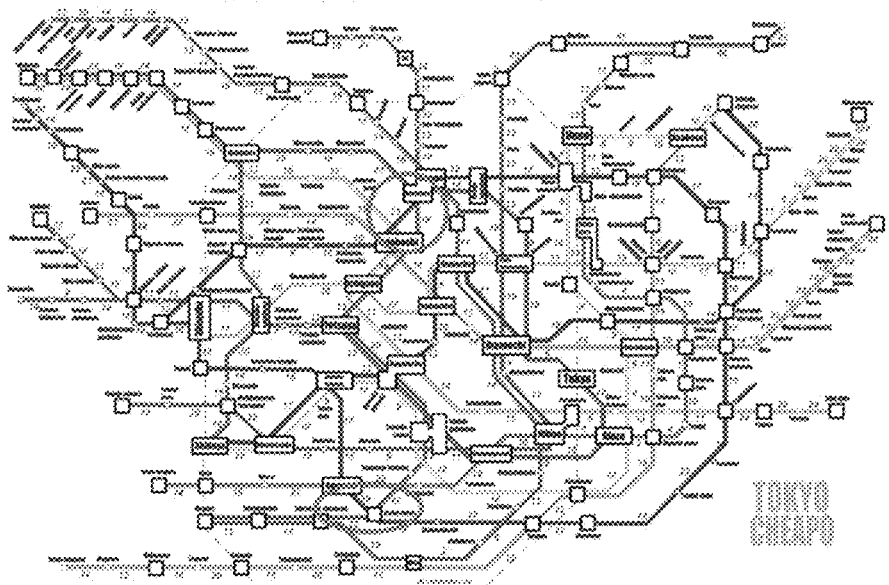

FIG. 20 shows the result of applying the color mapping described herein according to methods 100 and 400 to the two maps of FIG. 19.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A method for color mapping digital visual content for improved viewing by a color vision deficient observer, the method comprising:
    receiving a digital visual content to be color mapped;
    determining at least one portion of said digital visual content to which color mapping is to be applied;
    clustering colors values of said at least one portion into a plurality of color clusters;
    assigning each color cluster to a respective one of a set of target color values, the set of target color values having increased visual distinguishability for the color vision deficient observer, wherein assigning each color cluster to a respective one of a set of target color values comprises:
        assigning each color cluster to a corresponding subarea of an intermediate color space; and
        defining a target color value for each subarea of the intermediate color space, wherein the intermediate color space is defined along a first axis corresponding to a one directional color variation being distinguishable by the color vision deficient observer and a second axis corresponding to a brightness channel; and
    for each color cluster, mapping the color values of the color cluster to the target color value, thereby generating a color-mapped digital visual content.

2. The method of claim 1, wherein defining the target color value for each subarea of the intermediate color space comprises:
    following along a confusion line within a color space of the target color values to a color value nearest to the value of the color cluster assigned to the subarea of the intermediate color space.

3. The method of claim 1, wherein the assigning each color cluster to the corresponding subarea of the intermediate color space is carried out by assigning the color clusters sequentially, the assigning comprising:
    for each given color cluster, assigning the given color cluster within the sequence to a given sub region of the intermediate color space having a position corresponding to a color value of the given color cluster while ensuring no overlap in the intermediate color space;
    wherein if the given color cluster would be assigned to an overlapping sub region in the intermediate color space, assigning the given color cluster to a nearby unoccupied sub region in the intermediate color space.

4. The method of claim 1, wherein said at least one portion corresponds to the entirety of said digital visual content.

5. A method for color mapping digital visual content for improved viewing by a color vision deficient observer, the method comprising:
    receiving a digital visual content to be color mapped;
    determining at least one portion of said digital visual content to which color mapping is to be applied, wherein determining at least one portion of said digital visual content comprises:
        determining one or more regions of interest corresponding to at least one graphical element; and
        filtering out digital visual content corresponding to captured elements; and wherein the color mapping is only applied to the graphical element;
    clustering colors values of said at least one portion into a plurality of color clusters;
    assigning each color cluster to a respective one of a set of target color values, the set of target color values having increased visual distinguishability for the color vision deficient observer; and for each color cluster, mapping the color values of the color cluster to the target color value, thereby generating a color-mapped digital visual content.

6. A method for color mapping digital visual content for improved viewing by a color vision deficient observer, the method comprising:
- receiving a digital visual content to be color mapped;
- determining at least one portion of said digital visual content to which color mapping is to be applied;
- clustering colors values of said at least one portion into a plurality of color clusters,
- wherein the clustering comprises:
- identifying, from the digital visual content, a plurality of regions having similar color values;
- wherein the clustering color values comprises clustering the plurality of regions into the plurality of color clusters; and
- wherein identifying the plurality of regions having similar color values comprises
- applying a flood fill to the digital visual content to generate a flood fill area,
- wherein the flood filled area corresponds to a group of color values to be clustered within a same color cluster;
- assigning each color cluster to a respective one of a set of target color values, the set of target color values having increased visual distinguishability for the color vision deficient observer; and
- for each color cluster, mapping the color values of the color cluster to the target color value, thereby generating a color-mapped digital visual content.

7. A method for color mapping digital visual content for improved viewing by a color vision deficient observer, the method comprising:
- receiving a digital visual content to be color mapped;
- determining at least one portion of said digital visual content to which color mapping is to be applied;
- clustering colors values of said at least one portion into a plurality of color clusters, wherein clustering color values of the digital visual content into a plurality of color clusters comprises:
- initially clustering the color values by chroma to generate a first intermediate set of color clusters; and
- further separating the first intermediate set of color clusters by brightness, thereby generating the plurality of color clusters;
- assigning each color cluster to a respective one of a set of target color values, the set of target color values having increased visual distinguishability for the color vision deficient observer; and
- for each color cluster, mapping the color values of the color cluster to the target color value, thereby generating a color-mapped digital visual content.

8. The method of claim 7, wherein the initial clustering of the color values by chroma is carried out based on a and b values in the Lab space; and
- wherein the further separating is carried out based on L values in the Lab space.

9. The method of claim 7, wherein assigning each color cluster to a respective one of a set of target color values comprises:
- determining pairs of color clusters located on a same confusion line for a given class of color vision deficiency for the observer and having the same brightness value;
- for each determined pair, adjusting a brightness value for one of the color clusters of the pair, the color value having the adjusted brightness value forming the target color value for said one color cluster of the pair, if adjusting the brightness value causes overlap with another color cluster on the same confusion line, adjusting the chroma for said one of the color clusters of the pair, the color value having the adjusted chroma value forming the target color value for said one color cluster of the pair; and
- wherein if a color cluster is not located on the same confusion line as another color cluster or does not have the same brightness as another color cluster, maintaining the color value of the cluster as the target color value.

* * * * *